(12) United States Patent
Rowe et al.

(10) Patent No.: US 10,942,112 B2
(45) Date of Patent: Mar. 9, 2021

(54) METHODS, SYSTEMS, ARRANGEMENTS AND COMPUTER-ACCESSIBLE MEDIUM FOR PROVIDING MICRO-OPTICAL COHERENCE TOMOGRAPHY PROCEDURES

(71) Applicants: The General Hospital Corporation, Boston, MA (US); The UAB Research Foundation, Birmingham, AL (US)

(72) Inventors: Steven M. Rowe, Birmingham, AL (US); Guillermo J. Tearney, Cambridge, MA (US); Brett Eugene Bouma, Quincy, MA (US); Linbo Liu, Cambridge, MA (US); Eric J. Sorscher, Birmingham, AL (US); Kengyeh Ken Chu, Jamaica Plain, MA (US); Bradford James Diephuis, Brookline, MA (US); Eric James Wilsterman, Boston, MA (US); Gregory Andrew Dierksen, Brookline, MA (US)

(73) Assignees: The General Hospital Corporation, Boston, MA (US); The UAB Research Foundation, Birmingham, AL (US)

( * ) Notice: Subject to any disclaimer, the term of this patent is extended or adjusted under 35 U.S.C. 154(b) by 0 days.

(21) Appl. No.: 16/365,188

(22) Filed: Mar. 26, 2019

(65) Prior Publication Data
US 2019/0285539 A1    Sep. 19, 2019

Related U.S. Application Data

(63) Continuation of application No. 14/240,938, filed as application No. PCT/US2012/052553 on Aug. 27, 2012, now Pat. No. 10,241,028.
(Continued)

(51) Int. Cl.
*G01B 9/02* (2006.01)
*G01N 21/17* (2006.01)
(Continued)

(52) U.S. Cl.
CPC .......... *G01N 21/17* (2013.01); *G01B 9/0205* (2013.01); *G01B 9/02044* (2013.01);
(Continued)

(58) Field of Classification Search
CPC ........ G01N 21/17; G01N 21/35; G01N 21/45; G01N 21/4788; G01N 21/4795;
(Continued)

(56) References Cited

U.S. PATENT DOCUMENTS

| 6,564,087 B1 * | 5/2003 | Pitris | A61B 1/00172 600/478 |
| 2004/0115683 A1 * | 6/2004 | Medford | C12Q 1/6897 435/6.12 |

(Continued)

OTHER PUBLICATIONS

European Patent Office, Office Action for application EP 12826303.5, dated Oct. 23, 2019, 8 pages.
(Continued)

*Primary Examiner* — Tarifur R Chowdhury
*Assistant Examiner* — Jonathon Cook
(74) *Attorney, Agent, or Firm* — Quarles & Brady LLP

(57) ABSTRACT

Exemplary apparatus and method can be provided for obtaining data regarding a plurality of samples. For example, using at least one arrangement, it is possible to receive interferometric information that is based on radiations provided from a reference and the samples that are provided in respective chambers. Alternatively and/or in addition, based on the interferometric information, it is
(Continued)

possible to discriminate between agents to identify a particular agent that affects a particular function within at least one of the samples.

21 Claims, 30 Drawing Sheets

Related U.S. Application Data

(60) Provisional application No. 61/527,701, filed on Aug. 26, 2011, provisional application No. 61/527,446, filed on Aug. 25, 2011.

(51) Int. Cl.
| | |
|---|---|
| *G01N 21/45* | (2006.01) |
| *G01N 21/47* | (2006.01) |
| *G01J 3/45* | (2006.01) |
| *G01J 9/02* | (2006.01) |
| *G01N 15/02* | (2006.01) |
| *G01N 21/35* | (2014.01) |
| *G01N 21/64* | (2006.01) |
| *G01N 29/00* | (2006.01) |
| *G01N 21/65* | (2006.01) |
| *G01N 15/14* | (2006.01) |

(52) U.S. Cl.
CPC ............ *G01B 9/02091* (2013.01); *G01J 3/45* (2013.01); *G01J 9/02* (2013.01); *G01N 15/0205* (2013.01); *G01N 21/35* (2013.01); *G01N 21/45* (2013.01); *G01N 21/4788* (2013.01); *G01N 21/4795* (2013.01); *G01N 21/6486* (2013.01); *G01N 29/00* (2013.01); *G01N 15/14* (2013.01); *G01N 21/6458* (2013.01); *G01N 2021/653* (2013.01); *G01N 2021/655* (2013.01)

(58) Field of Classification Search
CPC ........... G01N 21/6486; G01N 15/0205; G01B 9/02044; G01B 9/0205; G01B 9/02091; G01J 3/45; G01J 9/02
See application file for complete search history.

(56) References Cited

U.S. PATENT DOCUMENTS

| | | | |
|---|---|---|---|
| 2006/0241503 A1* | 10/2006 | Schmitt | ................ A61B 5/0066 600/478 |
| 2009/0024191 A1* | 1/2009 | Seibel | .................. A61B 1/0008 607/92 |
| 2009/0131801 A1 | 5/2009 | Suter | |
| 2009/0185166 A1 | 7/2009 | Oldenburg | |
| 2010/0280315 A1* | 11/2010 | Pan | ...................... A61B 5/0066 600/109 |
| 2011/0137140 A1 | 6/2011 | Tearney | |

OTHER PUBLICATIONS

Mcdowell, E. J., et al. "Spectral domain phase microscopy for local measurements of cytoskeletal rheology in single cells." Journal of Biomedical Optics 12.4 (2007): 044008.

* cited by examiner

METHODS, SYSTEMS, ARRANGEMENTS AND COMPUTER-ACCESSIBLE MEDIUM FOR PROVIDING MICRO-OPTICAL COHERENCE TOMOGRAPHY PROCEDURES

CROSS-REFERENCE TO RELATED APPLICATION(S)

This application is a continuation of U.S. patent application Ser. No. 14/240,938, filed Mar. 4, 2015, which is the United States National Stage Entry of International Application No. PCT/US2012/052553, filed Aug. 27, 2012, which is based upon and claims the benefit of priority from U.S. Patent Application No. 61/527,446, filed Aug. 25, 2011, and U.S. Patent Application No. 61/527,701, filed Aug. 26, 2011, the entire disclosures of which are incorporated herein by reference.

STATEMENT REGARDING FEDERALLY SPONSORED RESEARCH

This invention was made with government support under DAMD17-99-2-9001 awarded by the U.S. Department of the Army, and BES-0086789 awarded by the National Science Foundation. The government has certain rights in the invention.

FIELD OF THE DISCLOSURE

Exemplary embodiments of the present disclosure relate to methods, systems, arrangements and computer-accessible medium for providing micro-optical coherence tomography procedures, and more particularly to exemplary methods, systems, arrangements and computer-accessible medium for analyzing respiratory airways and other ciliated tissues using micro-optical coherence tomography procedures.

BACKGROUND INFORMATION

The Complex Airway Epithelial Apparatus and its Role in Health and Disease

The human lung is suited for providing gas exchange from the atmosphere to the body: with every breath, oxygen enters the bloodstream, and carbon dioxide is removed. This constant environmental exposure makes the defense systems of the lung extremely important in maintaining health and preventing disease. Specifically, the surface epithelial cells which line the lung are protected by a tightly regulated layer of mucus which functions to entrap pathogens and inhaled particulates. These cells also contain tiny hair-like projections called cilia which propel the semi-liquid mucus gel layer out of the lung. This system, commonly called the mucociliary clearance (MCC) apparatus, facilitates the lung to entrap and clear particles and pathogens which enter the lung from the environment. Cilia are complex in structure, with outer and inner rings of microtubules which propel the cilia in specific beat patterns that are also coordinated with one another. Other parts of the apparatus are similarly complex, including the content and molecular makeup and the electrolyte and water content of the mucus gel layer, which determine its physical characteristics and transportability. When the mucociliary clearance apparatus is impaired, whether due to malformation or dysfunction of cilia, dysregulation of the ion and water transport, abnormalities of the mucus itself, or other insults, lung disease can result.

Many Diseases Linked to Ciliary Dysfunction

Many diseases are affected by dysfunction of the functional microanatomy of the airway and consequently the mucociliary clearance apparatus. For example, cystic fibrosis (CF) is the most common lethal genetic disease in the Caucasian population, and is a significant cause of morbidity and early mortality from progressive lung disease. (See Rowe S M, et al., Cystic fibrosis, N Engl J Med 2005; 352:1992-2001.) About 30,000 children and adults in the United States are affected by CF and the prevalence is estimated at 70,000 worldwide. Further, mild diseases due to partial abnormalities in the causative CF protein, termed cystic fibrosis transmembrane regulator (CFTR), are about 10-fold more common than typical forms of the disease. It is well established that the primary defect in CF, dysfunction of the CFTR protein, results in abnormal mucociliary clearance (MCC) due to the absence of chloride and bicarbonate transport, and is associated with dysregulation of the airway surface liquid (ASL) and periciliary liquid layer (PCL) depths. As another example, primary ciliary dyskinesia (PCD) is a disorder in which structural ciliary defects result in abnormal ciliary motion, which in turn leads to impaired mucociliary clearance and susceptibility to recurrent sinopulmonary infections. (See Bush A et al. "Primary ciliary dyskinesia: current state of the art. Archives of disease in childhood", 2007; 92: 1136-40). Chronic obstructive pulmonary disease (COPD), recently the third leading cause of death in the U.S., is also characterized by mucus stasis and impaired mucociliary clearance. Other common lung diseases are also affected by dysfunction of the epithelial surface, including, but not limited to, types of interstitial lung disease such as its most common form idiopathic pulmonary fibrosis which are characterized by abnormal function of the surface mucins, the proteins that form the mucus gel.

Even people with normal epithelial function and a normally functioning cellular mucociliary clearance apparatus during health can also be impacted by difficulty with impaired mucus clearance and increased mucus production. For example, individuals with neuromuscular weakness caused by congenital or genetic conditions, such as, but not limited to, muscular dystrophy, spinal muscular atrophy, and amyotrophic lateral sclerosis, suffer with recurrent pneumonia due to poor cough clearance which leads to mucous stasis. In addition, individuals with acquired anatomic problems resulting in muscular weakness, such as but not limited to, paraplegia, quadriplegia, diaphragmatic paralysis and the like, suffer the same fate. Other subjects, such as those suffering from excess mucus production due to conditions such as, but not limited to, asthma and status asthmaticus, those suffering from impaired immunity due to conditions such as, but not limited to, immunoglobulin deficiency, SCID, hyper-IgE syndrome, and similar conditions, those suffering from anatomic respiratory abnormalities impairing mucus clearance, those suffering from recurrent pneumonia for unclear causes and those suffering from oropharyngeal abnormalities, suffer from atelectasis and/or pneumonia due to excess mucus production that overwhelms the capacity of the mucociliary clearance apparatus to transport it effectively. These disorders due to impaired mucous clearance and/or excess mucous production has been a serious recurrent problem causing considerable morbidity and are also a contributing cause to mortality.

The Role of Rheology in the Study of Disease

Mucus itself can be characterized in part by its viscosity, or its resistance to physical flow. Thicker, more viscous mucus is more difficult for the mucociliary apparatus to clear, contributing to disease. The study of viscosity by rheology measurements allows for characterizing mucus physical properties, understanding mechanisms of human disease, and evaluating the effect of therapeutics to address abnormal mucus. May studies have shown that expectorated sputa from CF patients are abnormal, demonstrating a highly viscous nature and increased percentage of solid content. (See Serisier D J et al., "Macrorheology of cystic fibrosis, chronic obstructive pulmonary disease & normal sputum", Respiratory research 2009; 10:63; Chernick W S and Barbero G J, "Composition of tracheobronchial secretions in cystic fibrosis of the pancreas and bronchiectasis", Pediatrics 1959; 24:739-45; Matsui H et al., "Reduced three-dimensional motility in dehydrated airway mucus prevents neutrophil capture and killing bacteria on airway epithelial surfaces", J Immunol 2005; 175: 1090-9; Dawson M at al., "Enhanced viscoelasticity of human cystic fibrotic sputum correlates with increasing microheterogeneity in particle transport", J Biol Chem 2003; 278:50393-401; and Martens C J et al., "Mucous Solids and Liquid Secretion by Airways: Studies with Normal Pig, Cystic Fibrosis Human, and Non-Cystic Fibrosis Human Bronchi", American journal of physiology Lung cellular and molecular physiology 2011) Prior studies have also suggested that COPD sputum has increased viscosity. (See Redding G J et al. "Physical and transport properties of sputum from children with idiopathic bronchiectasis", Chest 2008; 134:1129-34). Mucus is also characterized by its adherence. Abnormal adherence to the surface structures of the airway are thought to substantially contribute to clinical disease.

Limitations of Current Methods

Certain methods for investigating the functional microanatomy of the airway surface in natural, untreated airway epithelia, including cell and tissue culture systems and in vivo methods, are limited. Current knowledge of respiratory cilia and PCL morphology is based on electron microscopy. (Matsui H. et al., "Evidence for periciliary liquid layer depletion, not abnormal ion composition, in the pathogenesis of cystic fibrosis airways disease", Cell 1998; 95:1005-15; and Sanderson M J and Sleigh M A, "Ciliary activity of cultured rabbit tracheal epithelium—beat pattern and metachrony", Journal of Cell Science 1981; 47:331-47.) These methods only provide static images of epithelia when they are not functioning; fixation and harsh processing are likely to alter cilia and PCL morphology, and could account for disparities in the conclusions on the role of ASL/PCL in CF and other lung diseases. ASL height can be measured in vitro using confocal microscopy by aid of fluorescent staining, but is technically challenging, difficult to achieve the high axial resolution required to accurately assess ASL/PCL, and prone to artifacts caused by interference or removal of the native fluid and flow by the exogenous contrast agents. (See also Randell S H, and Boucher R C, "Univ NCVLG. Effective mucus clearance is essential for respiratory health", American Journal of Respiratory Cell and Molecular Biology 2006; 35:20-8). Measuring mucociliary transport (MCT) by tracking fluorescent beads is problematic because the beads are known to cause the mucus to agglomerate and significantly slow transport rates. In addition to these limitations, spatial and temporal correlation are very difficult with these assays, as measurement of ciliary beat frequency (CBF), ASL, PCL and MCT are generally done at different time points with different imaging modalities, processing methods, and cells. Likely, none of these methods are suitable for use in vivo, including both human testing and experimental animals to characterize the effect of drugs. Since these parameters are closely interrelated and can influence each other, it is essential to monitor these parameters simultaneously to gain a full understanding of the functional airway.

Accordingly, it may be beneficial to address at least some of the above-described deficiencies.

Unique Advantages of µOCT

Techniques for reflectance microscopy in vivo have recently been introduced for the visualization of tissue microstructure at architectural and cellular levels. These include optical coherence tomography (OCT) which has been developed to provide unprecedented cellular detail and live motion capture. (See Tearney G J et al., "In vivo endoscopic optical biopsy with optical coherence tomography", Science 1997; 276:2037-9; Fujimoto J G et al., "Optical coherence tomography: An emerging technology for biomedical imaging and optical biopsy", Neoplasia 2000; 2:9-25; Drexler W et al., "In vivo ultrahigh-resolution optical coherence tomography", Optics Letters 1999; 24:1221-3; Gabriele M L et al., "Peripapillary nerve fiber layer thickness profile determined with high speed, ultrahigh resolution optical coherence tomography high-density scanning", Investigative Ophthalmology & Visual Science 2007; 48:3154-60; Srinivasan V J et al., "Noninvasive volumetric Imaging and morphometry of the rodent retina with high-speed, ultrahigh-resolution optical coherence tomography", Investigative Ophthalmology & Visual Science 2006; 47:5522-8; Wojtkowski M. et al., "Three-dimensional retinal imaging with high-speed ultrahigh-resolution optical coherence tomography", Ophthalmology 2005; 112:1734-46; Tearney G J et al., "In vivo endoscopic optical biopsy with optical coherence tomography", Science 1997; 276: 2037-9; and Vakoc B J et al. "Three-dimensional microscopy of the tumor microenvironment in vivo using optical frequency domain imaging", Nat Med 2009; 15:1219-23). The technology uses the reflectance signature of near-infrared light to permit real-time imaging with cellular level detail, and has been employed successfully for microscopic analysis of coronary artery and esophageal mucosa by the endoscopic approach in living human subjects. OCT uses coherence gating for optical sectioning to attain an axial resolution or section thickness ranging from 1-10 µm. (See Yun S H et al., "Comprehensive volumetric optical microscopy in vivo", Nat Med 2006; 12:1429-33; Jang I K et al., "Visualization of coronary atherosclerotic plaques in patients using optical coherence tomography: Comparison with intravascular ultrasound", Journal of the American College of Cardiology 2002; 39:604-9; Yabushita H. et al., "Characterization of human atherosclerosis by optical coherence tomography", Circulation 2002; 106:1640-5; Tearney G J et al., "Quantification of macrophage content in atherosclerotic plaques by optical coherence tomography", Circulation 2003; 107:113-9; MacNeill B D et al., "Focal and multi-focal plaque distributions in patients with macrophage acute and stable presentations of coronary artery disease", Journal of the American College of Cardiology 2004; 44:972-9; Jang I K et al., "In vivo characterization of coronary atherosclerotic plaque by use of optical coherence tomography", Circulation 2005; 111:1551-5; Vakoc B J et al., "Comprehensive esophageal microscopy by using optical frequency-domain imaging (with video)", Gastrointestinal Endoscopy 2007; 65:898-905; Yun S H et al., "Comprehensive volumetric optical microscopy in vivo", Nature Medicine 2006; 12:1429-33; Poneros J M et al., "Diagnosis of specialized intestinal metaplasia by optical coherence tomography", Gastroenterology 2001; 120:7-12; and Evans J A et al., "Mino-Kenudson M, Nishioka N S, Tearney G J. Optical coherence tomography to identify intramucosal carcinoma and high-grade dysplasia in Barrett's esophagus", Clinical Gastroenterology and Hepatology 2006; 4:38-43).

Since OCT is not reliant on a high numerical aperture lens, it can employ an imaging lens with a relatively large confocal parameter, facilitating a greater penetration depth (about 1 mm) and a cross-sectional display format. OCT is particularly well suited for non-invasive microscopy in cells and tissues since it can be implemented via small, flexible probes, does not require contact with the cell surface or use of contrast medium, and acquires high resolution images with very rapid acquisition times and flexible focal range.

An acquisition of the OCT signal in the wavelength domain as opposed to the time domain can provide orders of magnitude improvement in imaging speed while maintaining excellent image quality. One such second-generation imaging technology is termed micro-OCT (μOCT). (See de Boer J F et al., "Improved signal-to-noise ratio in spectral-domain compared with time-domain optical coherence tomography", Optics Letters 2003; 28:2067-9; Choma M A et al., "Sensitivity advantage of swept source and Fourier domain optical coherence tomography", Optics Express 2003; 11:2183-9; Nassif N. et al., "In vivo human retinal imaging by ultrahigh-speed spectral domain optical coherence tomography" Optics Letters 2004; 29:480-2; and Yun S H et al., "High-speed wavelength-swept semiconductor laser with a polygon-scanner-based wavelength filter", Optics Letters 2003; 28: 1981-3).

With μOCT, high-resolution ranging is conducted in tissue by detecting spectrally resolved interference between the tissue sample and a reference. (See also Wojtkowski M. et al., "In vivo human retinal imaging by Fourier domain optical coherence tomography", J Biomed Opt 2002; 7:457-63). Since μOCT can utilize a high-speed linear camera, it is capable of capturing images at more than 50 million pixels per second, which is approximately two orders of magnitude faster than conventional time-domain OCT systems. (See also Wojtkowski M. et al., "Three-dimensional Retinal Imaging with High-Speed Ultrahigh-Resolution Optical Coherence Tomography", Ophthalmology 2005). By using light sources with large spectral bandwidths (~150 nm), recent studies have shown that μOCT images can be obtained in vivo with an axial resolution of approximately 2 μm, which is adequate to visualize the PCL, beating cilia, and mucosal glands. (See Gabriele M L et al., "Peripapillary nerve fiber layer thickness profile determined with high speed, ultrahigh resolution optical coherence tomography high-density scanning", Invest Ophthalmol Vis Sci 2007; 48:3154-60; Srinivasan V J et al., "Noninvasive volumetric imaging and morphometry of the rodent retina with high-speed, ultrahigh-resolution optical coherence tomography", Invest Ophthalmol Vis Sci 2006; 47:5522-8; and Wojtkowski M et al., "Three-dimensional retinal imaging with high-speed ultrahigh-resolution optical coherence tomography", Ophthalmology 2005; 112:1734-46). With this acquisition rate and resolution, μOCT is a very powerful tool for investigating the respiratory mucosa.

Status of Screening and Secondary Characterization

High throughput screening (HTS) for exemplary modulators of epithelial function has been successful as a drug discovery modality, identifying certain small molecules, biologics, and pathways relevant to human airway disease. While this is been particularly successful in CF to identify modulators of CFTR, the assay systems typically used are limited in scope, and cannot directly interrogate epithelial function relevant to mucociliary transport in humans. Rather, these approaches are reductionist towards specific pathways that may or may not be directly relevant to a broad array of human diseases. For example, almost all HTS technologies for CF attempt to identify alterations in chloride, halide, or sodium transport, and can only probe one of these pathways depending on the specific probe. This reductionist approach makes the assay limited in scope, and is relevant only to diseases where that ion transport pathway is relevant.

Accordingly, there is a need to address and/or at least some of the deficiencies described herein above.

OBJECTS AND SUMMARY OF EXEMPLARY EMBODIMENTS

Thus, at least some of the above-described issues and/or deficiencies can be addressed with the exemplary embodiments of the by providing exemplary methods, systems, arrangements and computer-accessible medium for providing micro-optical coherence tomography procedures.

For example, according to certain exemplary embodiments of μOCT system, method, arrangement and computer-accessible medium can provide a high spatial resolution and frame rate reported to date. With such exemplary embodiment of the methods, systems, arrangements and computer-accessible medium according to the present disclosure, cross-sectional images of tissue can be acquired at about 44 frames per second (fps) at an axial resolution of 1.5 μm and a transverse resolution of 2 μm. The size of a typical μOCT image can be about 3 mm×0.6 mm. Such exemplary embodiments of the methods, systems, arrangements and computer-accessible medium can facilitate, e.g., a simultaneous and high-resolution acquisition of ciliary beating (respiratory epithelium as well as other tissue types), ASL and PCL depths, and mucus transport in living, full thickness airway cells and tissues, and provides a quantitative measurement while also visualizing anatomy, without use of contrast dyes or other experimental manipulations.

The exemplary embodiment of the methods, systems, arrangements and computer-accessible medium can also be used simultaneously with dual fluorescence imaging. It is possible to acquire both fluorescence and structural/functional μOCT information simultaneously, from the same location on the sample. Using state-of-the art fluorescence assays of ion transport, chloride and bicarbonate influx can be measured and related to co-localized ASL, CBF, MCT and mucus rheology.

According to yet another exemplary embodiment of the present disclosure, it is possible to process of the μOCT datasets to provide robust and simultaneous measures of ASL, PCL, CBF, and MCT. The rapid, automated acquisition of these exemplary parameters facilitates an understanding of the physical interactions of cilia, ASL, PCL and mucus, and their collective influence on epithelial function. In addition, it is also possible to identify and track natural particles/inclusions in CT images of mucus to recover mucus viscosity. Compared with prior methods for measuring mucus properties, the advantages of the exemplary μOCT methods, systems, arrangements and computer-accessible medium in accordance with present disclosure, natural particle facilitate tracking for mucus microrheology which can be significant; and such exemplary embodiment also provide for the measurement to be obtained for in living subjects in situ. For example, the mucus properties can be determined simultaneously and co-localized with the structural functional parameters of MCC, and the findings are not subject to artifacts caused by adding exogenous particles to the mucus.

Further, the exemplary μOCT methods, systems, arrangements and computer-accessible medium in accordance with present disclosure can provide a more robust assay that identifies multiple epithelial functions simultaneously. Each of these functions can be directly relevant to human physiology, thus is much more likely to translate effectively to a broader array of human disease. For example, it is now possible to screen for compounds that improve mucociliary transport, a core physiologic function that may or may not depend on chloride transport. Alternatively, screens can be established for ciliary function, altered mucus viscosity, or hydrators of the mucus, depending on the purpose of the screen. This represents a major advantage over prior screens.

Based on the robust nature of the exemplary μOCT methods, systems, arrangements and computer-accessible medium in accordance with present disclosure, and the direct relevance to human physiology, the assay can also be established as a robust means to provide secondary characterization of drugs, molecules, or biologics and their effects on human physiology. At present, there may not be secondary assay that directly correlates with key functions of the epithelial surface. The direct assessment of surface epithelial functional testing can provide much greater predictive accuracy regarding the success of a novel agent in clinical testing. Because the exemplary μOCT methods, systems, arrangements and computer-accessible medium in accordance with present disclosure can be suitable for use in cell culture, tissue culture, or in vivo use in animal models or humans (see also below), the assay can provide secondary evaluation in a variety of primary, secondary, and tertiary model systems, and is unique in this regard. Additionally, it can be suitable for human proof of concept testing, providing an approach with unprecedented experimental continuity across model systems.

The exemplary μOCT methods, systems, arrangements and computer accessible medium in accordance with present disclosure can be suited to development of a probe device which could be used in vivo in human subjects. It is possible to provide an exemplary pulmonary μOCT probe that can have a high enough resolution to visualize respiratory cells, cilia, and native microparticle motion to determine mucus viscosity. For these purposes, the exemplary μOCT methods, systems, arrangements and computer-accessible medium in accordance with present disclosure can use a transverse resolution of 2-3 μm over an extended depth-of-field, or focal range. Using conventional optics, this focal range can be maintained by no greater than 50 μm. This focal range can be too small for cross-sectional imaging of the airways in vivo, which generally requires a focal range of approximately 500 μm in order to accommodate the diversity of probe-to-tissue distances across a reasonable field of view on a typically uneven surface of an in vivo subject. The exemplary embodiments of imaging probes described herein can illuminate an extended axial focus and contain a reference mirror for the interferometer. In order to facilitate stable imaging in the presence of subject motion, certain exemplary embodiments of the probe optics according to the present disclosure can be coupled to the subject via an exemplary balloon or wire baskets associated with the outer sheath of the probe.

Exemplary Applications Beyond Respiratory system

The exemplary μOCT methods, systems, arrangements and computer accessible medium in accordance with present disclosure can be used for investigating ciliary function disclosed herein are also applicable in organ systems inside and outside of the respiratory system in both humans and animals. Many other tissues contain ciliated cells, including but not limited to the Fallopian tubes of the female reproductive tract, sperm produced by the male reproductive tract, the ependyma of the brain, the photoreceptor cells of the eye, the renal tubules within the kidney, and embryonic cells which regulate organ formation and development. Manifestations of these ciliary abnormalities include, among others, human disease such as infertility (both male- and female-related causes), hydrocephalus and other congenital malformations of the brain including neuronal migration disorders, Bardet-Biedl syndrome and other causes of blindness, polycystic kidney disease, situs inversus and associated congenital heart diseases, and many other identified or suspected ciliopathies. μOCT can be applied to these other ciliated tissue structures as well, leading to new understanding and potential therapies for many devastating diseases.

Cilia Imaging—Exemplary μOCT Platform

The exemplary imaging platform can utilize optical reflectance depth profiles, images, volumes, or movies of respiratory and/or ciliated cells, tissues, or organs, including their secretions and immediate environment, using the exemplary μOCT technology. In particular, such exemplary embodiment according to the present disclosure can facilitate functional dynamic movements of cellular components, including cilia. This exemplary platform can provide the basis for some or all following exemplary embodiments, and can be used for an analysis of respiratory epithelium as well as other ciliated tissues.

High Throughput Screening

Among various exemplary embodiments of the exemplary μOCT methods, systems, arrangements and computer-accessible medium in accordance with present disclosure, one can be an ability to use the exemplary systems and methods for high throughput screening (HTS). HTS is a procedure of drug discovery in which a library of compounds is studied using automated methods to determine which, if any, are active for the outcome being studied. The exemplary underlying properties of μOCT, including its rapid acquisition time, non-invasive technique, and wide focal range make it a highly suitable technology for medium to high throughput screening methods. Further therapeutic drug screening programs have been provided that can use airway surface liquid depth as a principal readout, and agents that target CFTR or other ion transport pathways are prioritized based on preclinical use of this exemplary measurement.

The exemplary high throughput screening platform can also be combinable with simultaneous and co-registered fluorescence confocal imaging. Fluorescent markers enable dynamic assays of intracellular ion concentrations such as calcium and bicarbonate, which complements the exemplary μOCT data to provide an even more powerful tool for interrogation of epithelial physiology and evaluation of ciliary disease treatments.

Automated Algorithms for Image Analysis

Exemplary computer procedures developed for the analysis of μOCT high throughput screening output images are employed to extract relevant parameters such as airway surface liquid depth, mucociliary transport rate, and ciliary beat frequency. These measurements are performed automatically with minimal user invention to maximize throughput. A quality control procedure can remove spurious measurements and outliers, while the measurements from unrejected trials are aggregated, yielding final results.

Secondary Characterization

The exemplary μOCT methods, systems, arrangements and computer accessible medium in accordance with present disclosure can also be well suited for secondary characterization of agents preliminarily identified to be active in airway epithelia. Results will help elucidate the relationship between ASL regulation, cilia beating, and mucus propulsion, and establish functional profiles for compounds identified by earlier drug screening programs. Secondary evaluation of ion transport agents known to be active in airway epithelia assist to clarify relationship(s) between sodium and chloride channel activity, airway surface liquid regulation, ciliary activity, and mucus transport.

Imaging of Animal Models and Humans—Ex Vivo

Furthermore, the exemplary equipment can be suitable for imaging explanted lung tissues for validation in the intact airway. Tissues can be derived from donated human lung tissue, or from experimental animal models of both lung health and various lung diseases. The use of ex vivo tissues allows for environmental control and direct applications of various agents, allowing for proof of concept work prior to direct in vivo human applications.

Rheology

Mucus rheology can also be analyzed using the exemplary μOCT methods, systems, arrangements and computer-accessible medium in accordance with present disclosure. CF sputum generally exhibits increased viscosity when monitored by exogenous particle tracking microrheology, an exemplary technique in which the mean squared displacements (MSD) of fluorescent microparticles are measured and converted to viscosity by the generalized Stokes-Einstein relation (GSER). (See Dawson M. et al., "Enhanced viscoelasticity of human cystic fibrotic sputum correlates with increasing microheterogeneity in particle transport", J Biol Chem 2003; 278:50393-401). Since similarly sized natural particles or inclusions present in mucus scatter light and can be visible using μOCT, and because μOCT can have the resolution to determine the sizes of these natural particles (through straightforward deconvolution procedures), estimates of MSD have been recapitulated by tracking endogenous microparticles within mucus. When comparing conventional fluorescence particle tracking methods to exemplary μOCT-based endogenous particle tracking procedures on the same expectorated sputum samples, MSD results were very similar, thus, facilitating the exemplary μOCT methods, systems and arrangement to measure the mechanical properties of unaltered mucus in situ.

In Vivo Monitoring System/Diagnostic Device

The μOCT probes can be used in vivo to monitor the earliest features of pulmonary decline in disease such as cystic fibrosis. Monitoring patients before disease progression occurs can provide key information in the study of disease including key information regarding the anatomic and physical relationships of mucociliary clearance. Additionally, the exemplary μOCT probe can be used in context of suspicion of known and unknown diseases to evaluate for disorders affecting the functional airway microanatomy, and to precisely characterize specific abnormalities seen in individual patients.

Thus, according to certain exemplary embodiment of the present disclosure, exemplary apparatus and method can be provided for obtaining data regarding a plurality of samples. For example, using at least one arrangement, it is possible to receive interferometric information that is based on radiations provided from a reference and the samples that are provided in respective chambers.

For example, the arrangement(s) can comprise at least one optical configuration which is configured to focus at least one electromagnetic radiation on the samples. A depth range of the focus of the electromagnetic radiation(s) caused by the optical configuration(s) can be greater than a confocal parameter associated with a spot size of the focus. The optical configuration(s) can include an axicon lens arrangement, a binary apodization element, a phase apodization element, a diffractive optical element, an annulus, and/or a diffractive element. The arrangement(s) can also comprise a confocal arrangement, a fluorescence arrangement, Raman arrangement, an infrared arrangement, spectroscopic arrangement, a multiphoton arrangement, a multiharmonic arrangement, a nonlinear microscopy arrangement, a CARS SRS arrangement, or an ultrasound arrangement. Further, each of the respective chambers can have an agent which can be different from or same as another one of the agents. The arrangement(s) can be further configured to obtain the data using the interferometric information based on an interaction of the agents with the samples. One of the agents and another one of the agents (i) can differ from one another in a quantity or a concentration thereof, and/or (ii) are applied at different time periods within the respective chambers. At least one of the samples can include a living cell, and/or a cilia.

According to still another exemplary embodiment of the present disclosure, a method can be provided for obtaining data regarding a plurality of samples. For example, it is possible to receive interferometric information that is based on radiation provided from a reference and the samples that are provided in respective chambers. Further, based on the interferometric information, it is possible to discriminate between agents to identify a particular agent that effects a particular function within at least one of the samples. The particular function can include motion, and/or the particular agent can have at least one characteristic that is beneficial for a treatment of cystic fibrosis.

In yet another exemplary embodiment of the present disclosure, a method can be provided for reviewing therapeutic agents. For example, in this method, samples can be prepared, and manipulated to increase amount or viability thereof. At least one of the samples can be placed in at least one respective chamber. The chambers can be scanned using at least one arrangement which can be configured to receive interferometric information that is based on radiation provided from a reference and the at least one sample. At least one of the agents can be selected based on the scanning and the interferometric information. At least one of the samples can includes epithelial cells that have been dissected from a whole lung sample and expanded in flasks.

According to a further exemplary embodiment of the present disclosure, an apparatus can be provided for obtaining data regarding at least one of a plurality of structures. The exemplary apparatus can include a plurality of chambers which can at least partially include the structures, respectively. At least one arrangement can be provided which can receive interferometric information that is based on radiation provided from a reference and the structures.

In still further exemplary embodiment of the present disclosure, an apparatus can be provided for obtaining data regarding at least one sample. The apparatus can include at least one arrangement which can receive interferometric information that is based on radiation provided from a reference and the sample. This exemplary arrangement(s) can be configured to (i) obtain dynamic tracking data regarding particles associated with the sample(s) using the interferometric information, and (ii) determine biomechanical properties of the sample(s) using the dynamic tracking data.

According to still additional exemplary embodiment of the present disclosure, the particles can (i) be added and/or intrinsic to the at least one sample, and/or (ii) have a diameter that is less than 1 micron, 2 microns, or 5 microns.

The sample(s) can include mucus, and the particles can include inclusions in the mucus. The dynamic tracking data can include a measurement of a displacement and/or a size of at least one of the particles. The sample(s) can be provided in at least one respective chamber.

These and other objects, features and advantages of the present invention will become apparent upon reading the following detailed description of embodiments of the disclosure, when taken in conjunction with the appended claims.

BRIEF DESCRIPTION OF THE DRAWINGS

Further objects, features and advantages of the present disclosure will become apparent from the following detailed description taken in conjunction with the accompanying drawings showing illustrative embodiments of the present disclosure, in which:

FIG. 4 panels b to d are exemplary imaging results from a particular experiment using the exemplary μOCT procedures, systems, methods and arrangements;

Figure 1:
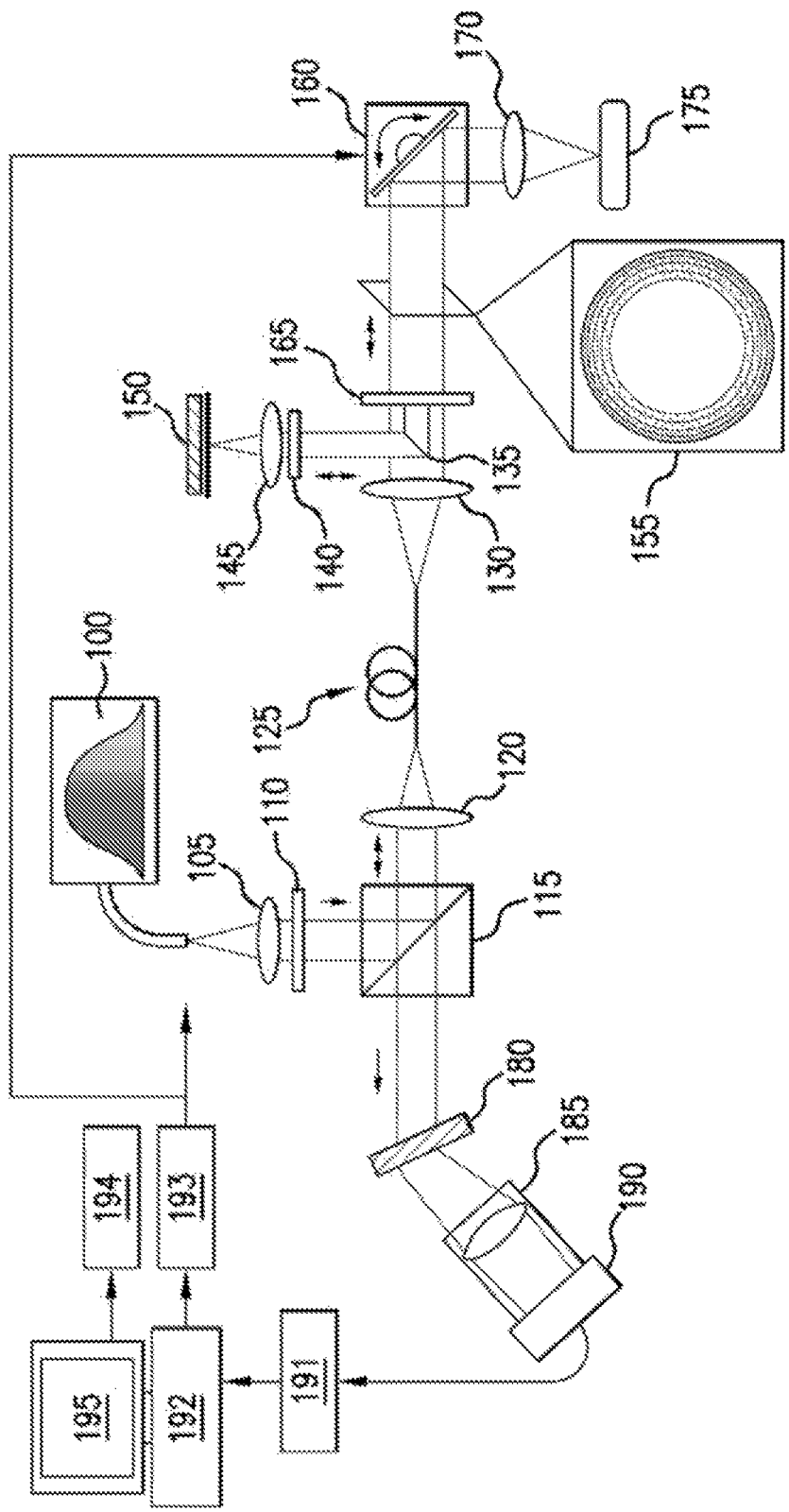
FIG. 1 is a diagram of an exemplary embodiment of a micron resolution Optical Coherence Tomography (μOCT) imaging platform according to the present disclosure.
Figure 2A:
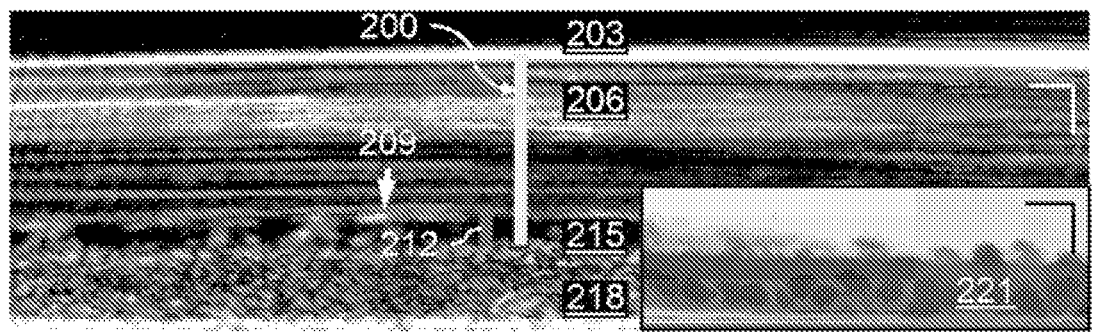
FIG. 2A is an exemplary μOCT image of normal human bronchial epithelial cells, averaged over time, showing distinguishable air, mucus, periciliary, and epithelial layers.
Figure 2B:
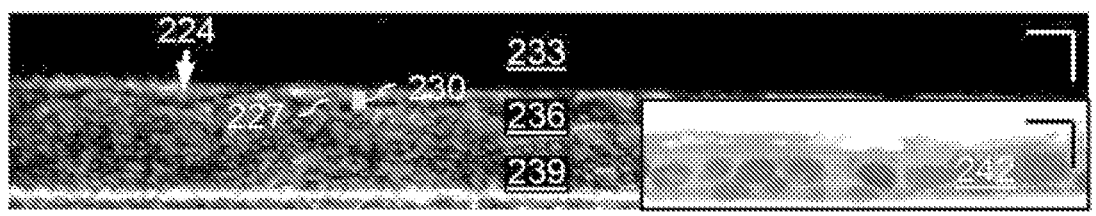
FIG. 2B is an exemplary μOCT image of CF human bronchial epithelial cells, showing depleted periciliary and mucus layers.
Figure 2C:
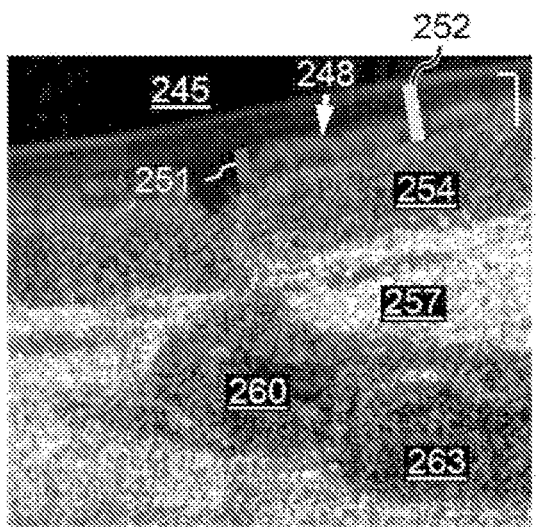
FIG. 2C is an exemplary μOCT image of intact normal newborn piglet trachea ex vivo, showing mucus, periciliary, and epithelial layers, as well as subsurface glandular structures.
Figure 2D:
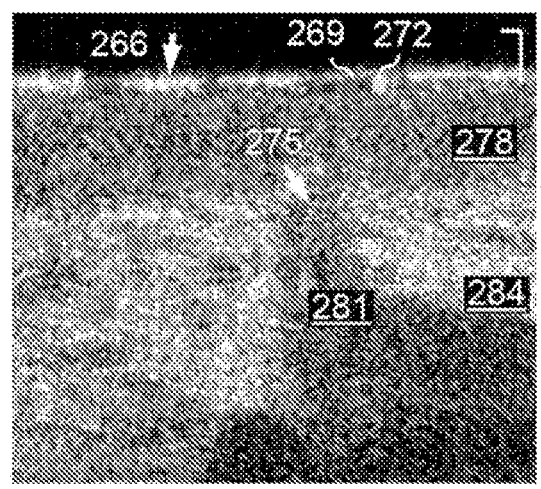
FIG. 2D is an exemplary μOCT image of intact CF newborn piglet trachea ex vivo, showing depleted periciliary and mucus layers.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject disclosure as defined by the appended claims.

DETAILED DESCRIPTION OF EXEMPLARY EMBODIMENTS

An exemplary μOCT system according to an exemplary embodiment of the present disclosure is shown in FIG. 1. For example, light, beam and/or other electro-magnetic radiation from a broadband source 100 can be collimated by a lens 105 and attenuated by a neutral density filter 110. The collimated, attenuated light/beam/radiation can pass through a beam splitter 115 before it is focused by a lens 120 onto a single mode fiber optic patch cable 125, and transmitted to an interferometer where it is re-collimated with lens 130. The center of the collimated beam can be redirected with, e.g., a 45° rod mirror 135 through a neutral density filter 140 and objective lens 145 where it is focused onto a reference mirror 150. The light/beam/radiation not redirected by the rod mirror 135 can form an annulus 155, and can pass through a transparent window 160 and a two dimensional scanning galvanometer 165 before being focused by an objective lens 170 onto a sample. Light/beam/radiation reflected back from the sample 175 can be collected in the objective lens 170, passes back through the galvanometer 160 and the window 165 before being recombined with light reflected from the reference mirror 150. The recombined light/beam/radiation can now contain interferometric information. The returning light/beam/radiation can be focused onto the single mode fiber optic cable 125 by a lens 130. The light/beam/radiation can be transmitted through the cable 125 and re-collimated by a lens 120 where it then passes through a beam splitter 115. The collimated light/beam/radiation can be separated into its spectral components by a diffraction grating 180 and focused by a lens 185 onto a detection array 190, thus likely creating one A-line of interferometric information. Such interferometric information can be transmitted from the detector 190 to an image acquisition device 191, and then to a computer 192 where the data can undergo processing for a display 195 and storage 194. The computer 192 can additionally output analog and/or digital signals 193 to control various parts of the device including the light source 100, the galvanometers 160, and the camera 192, and/or other peripheral devices not shown.

FIGS. 2A to 2D show exemplary imaging results from the exemplary μOCT procedure applied to respiratory epithelial cells. As shown in FIGS. 2A to 2D, in a time-averaged image of normal human bronchial epithelial (HBE) cells, e.g., distinct layers of air (203), mucus (206), cilia (209), PCL (215) and epithelium (218) can be visualized, and the morphology matches the inset image 221, a H&E stained sample of the same type. From the exemplary μOCT image, the ASL depth (200) and PCL depth (209) can be measured. In CF diseased HBE cells, air (233), mucus (236), cilia (224), and the epithelium (239) are seen, although the PCL depth (227) and ASL depth (230) are reduced. The exemplary H&E image in inset 242 corroborates the morphology. The exemplary imaging of intact tissue ex vivo can also be demonstrated with the exemplary μOCT systems, methods, arrangements and computer-accessible medium. For example, a scan of healthy newborn piglet trachea reveals clearly distinguishable lumen (245), cilia (248), epithelium (254), lamina propria (257), gland (263), and gland duct (260). PCL depth (251) and ASL depth (252) are easily measured. A scan of CF-afflicted newborn piglet trachea shows similar features, including the lumen (269), cilia (266), epithelium (278), lamina propria (284), and gland duct (281), but measured PCL depth (269) and ASL depth (272) are depleted.

Figure 3:
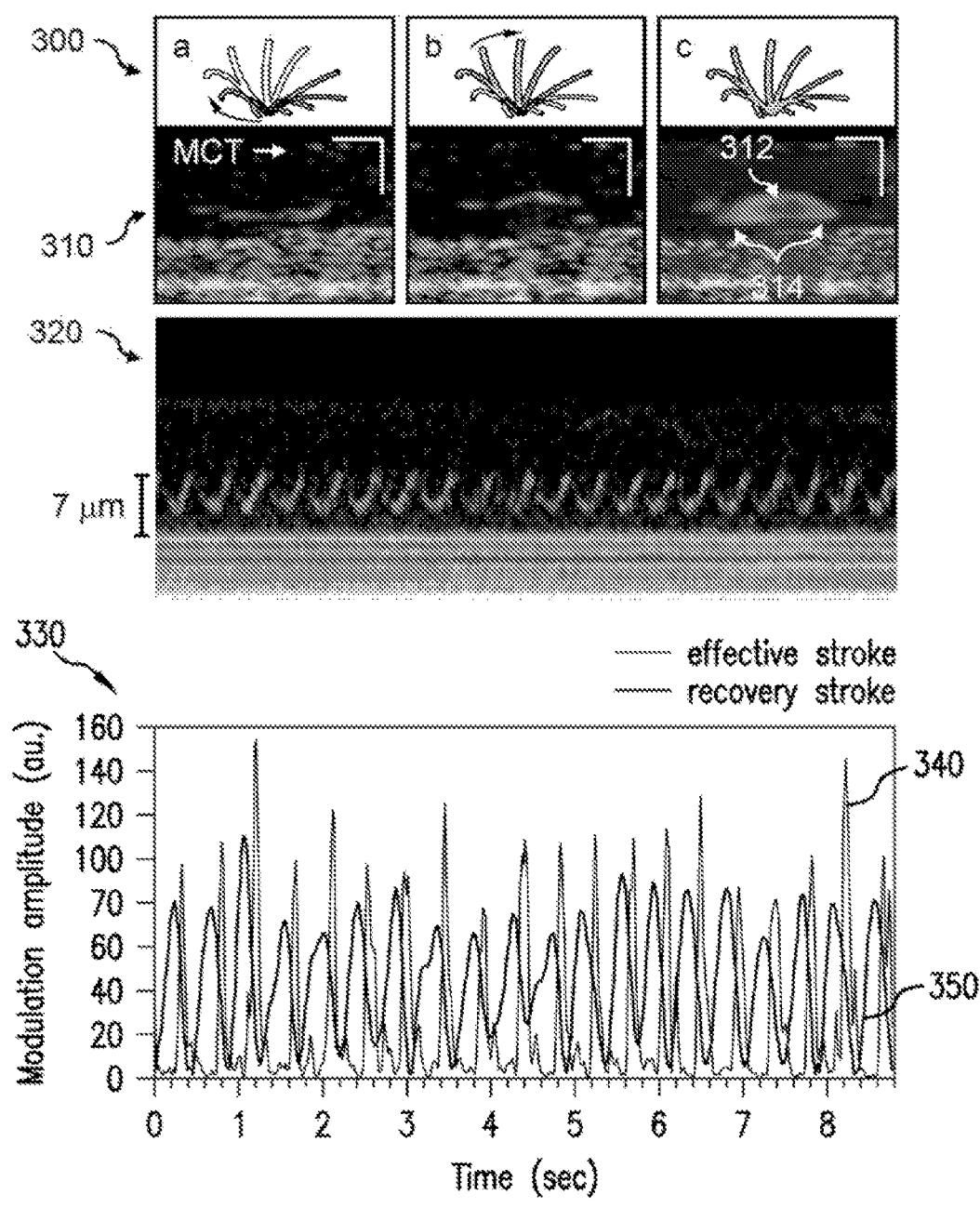
FIG. 3 is set of images providing illustrative diagrams of ciliary motion and exemplary μOCT images of ciliary motion showing distinguishable phases of the ciliary stroke, according to certain exemplary embodiments of the present disclosure.

FIG. 3 shows a set of illustrations which indicates the capacity of the exemplary μOCT systems, methods, arrangements and computer-accessible medium to analyze an active ciliary motion. For example, the top row (300) of FIG. 3 illustrates a schematic of stages of ciliary motion during the full ciliary beat cycle. Exemplary cross-sectional μOCT images of a cilium at two positions are presented in row 310 in columns A and B, as well as a time-averaged (4 seconds) recording in column C showing an arc indicating the effective strokes (312) and bilobular pattern of the recovery stroke (314). Scale bars are 10 μm. The ciliary motion pattern can be easily identified in the M-mode image of the active epithelial area shown at 320. Corresponding time-lapse intensity analysis (330) reveals triphasic pattern of the ciliary beat cycle: the recovery stroke (blue line, 350), the effective stroke (orange line, 340) and the rest phase in between the effective stroke and next effective stroke.

Figure 4:
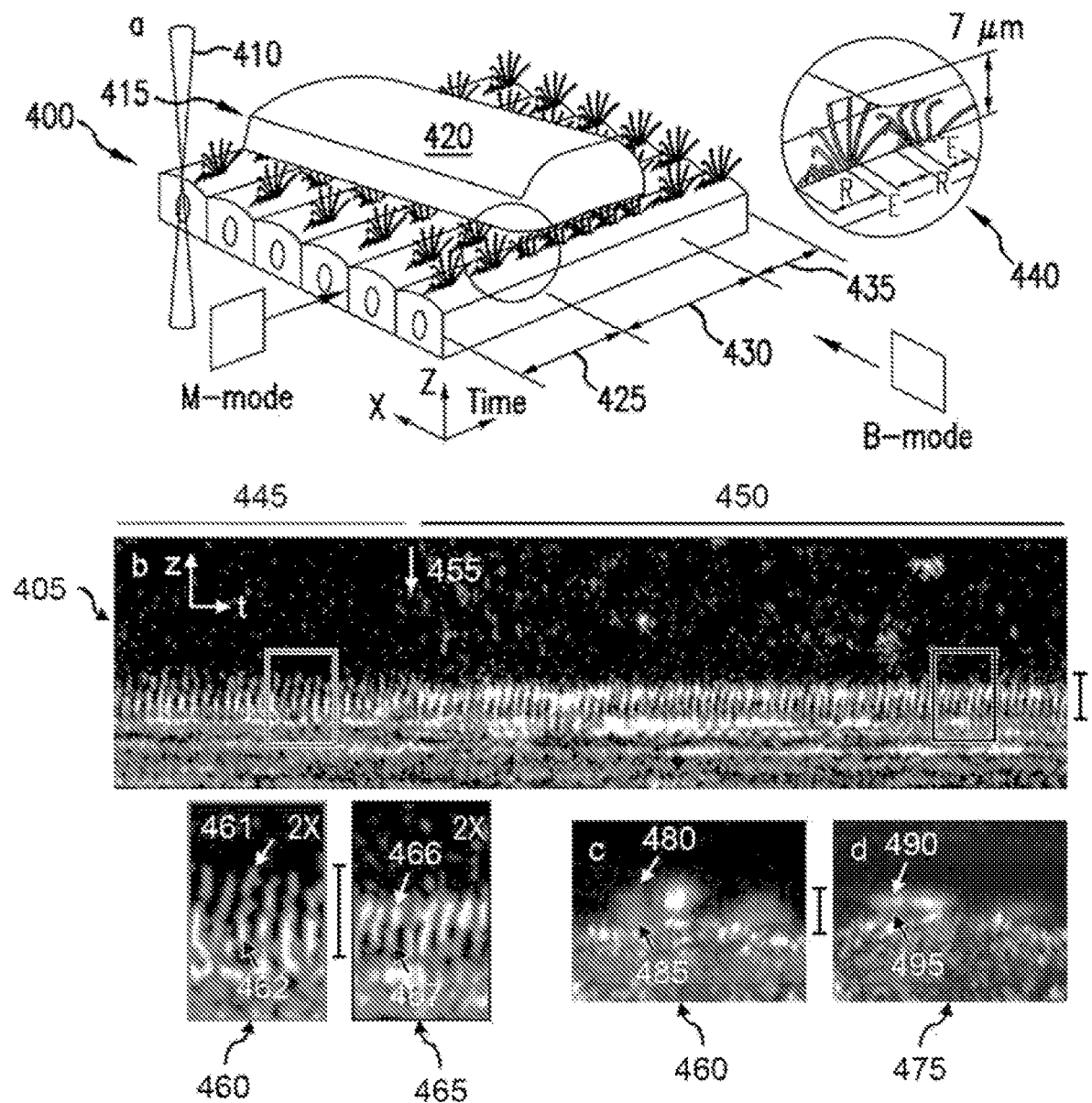
FIG. 4 panel a is a diagrams of an exemplary experiment utilizing exemplary μOCT procedures, systems, methods and arrangements to investigate ciliary motion under mucus loading.

FIG. 4 shows additional exemplary results from the exemplary μOCT systems, methods, arrangements and computer-accessible medium applied to ciliary motion, as well as illustrative diagrams. For example, each ciliary beat cycle can start with a recovery stroke followed by an effective stroke. During the recovery stroke, a bend can be propagated up the cilium causing the cilium to rotate backwards in a clockwise sweep in a zone beneath the mucus as depicted in a schematic (see FIG. 4, 400) from a perspective view. At the end of the recovery stroke, the cilium can progress immediately into the effective stroke, in which the cilia describes an arc of almost 110° in the cross-sectional plane and in the mucus transport direction (see FIG. 4 panels b and c, top panels) before reaching the rest phase. Alteration in duration of cilia in the effective stroke, the recovery stroke or the resting state can reflect response to stimulation and has significant effect on mucociliary clearance in addition to CBF itself.

The exemplary μOCT images can provide a way to analyse the relative state of ciliary activity. In the exemplary μOCT images, cilia tips appears as high intensity aggregated point scatterers, and because of the bend, the cilia tips appears at lower (e.g., 3-5 μm from the apical cell surface) position during the recovery stroke (see FIG. 4 panel b, left inset box) than in the effective stroke (see FIG. 4 panel b, right inset box) when cilia extend to their full length of—7 µm and described an arc of 109° with radius about 7 µm along the direction of the mucus transport. An exemplary time-averaged cross sectional µOCT image—see FIG. 4 panel b, 405—demonstrates typical ciliary beat pattern seen in the exemplary µOCT images, which is characterized by an arc pattern with a peak about 7 µm above the apical cell surface (see light arrow) and a bilobular pattern with about 3-5 µm above the apical cell surface and just below the arc, indicating recovery strokes. In M-mode view of the exemplary µOCT cilia images (FIG. 4 panels c and d), time-lapse ciliary motion can be clearly seen which can be used to characterize metachony wave of the ciliary motion. The exemplary signal intensity and duration of the effective stroke and recovery stroke might reflect the status of the exemplary ciliary activity or ciliary load.

Figure 5:
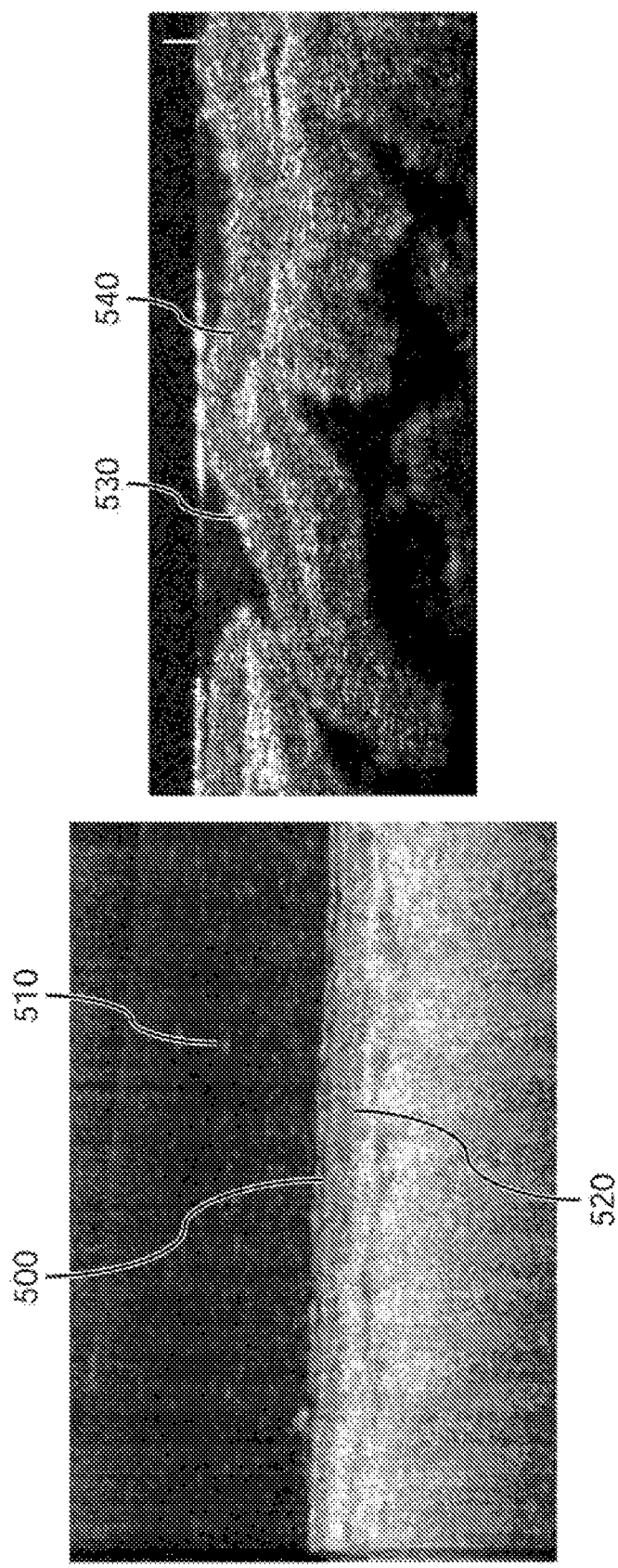
FIG. 5 is a set of exemplary μOCT images of cilia in non-respiratory murine and porcine tissue.

FIG. 5 shows exemplary results of images from the exemplary µOCT imaging procedure of non-respiratory tissue in murine and porcine animal models. Cilia 500 appear as high intensity aggregated point scatterers in the low intensity background representing cerebrospinal fluid 510. The ependymal epithelium 520 has a lower intensity than that of cilia but higher than that of the cerebrospinal fluid. Additionally, in the exemplary µOCT images, oviduct cilia 530 can appear as high intensity aggregated point scatterers. The oviduct epithelium 540 can have a lower intensity than that of the oviduct cilia.

Figure 6:
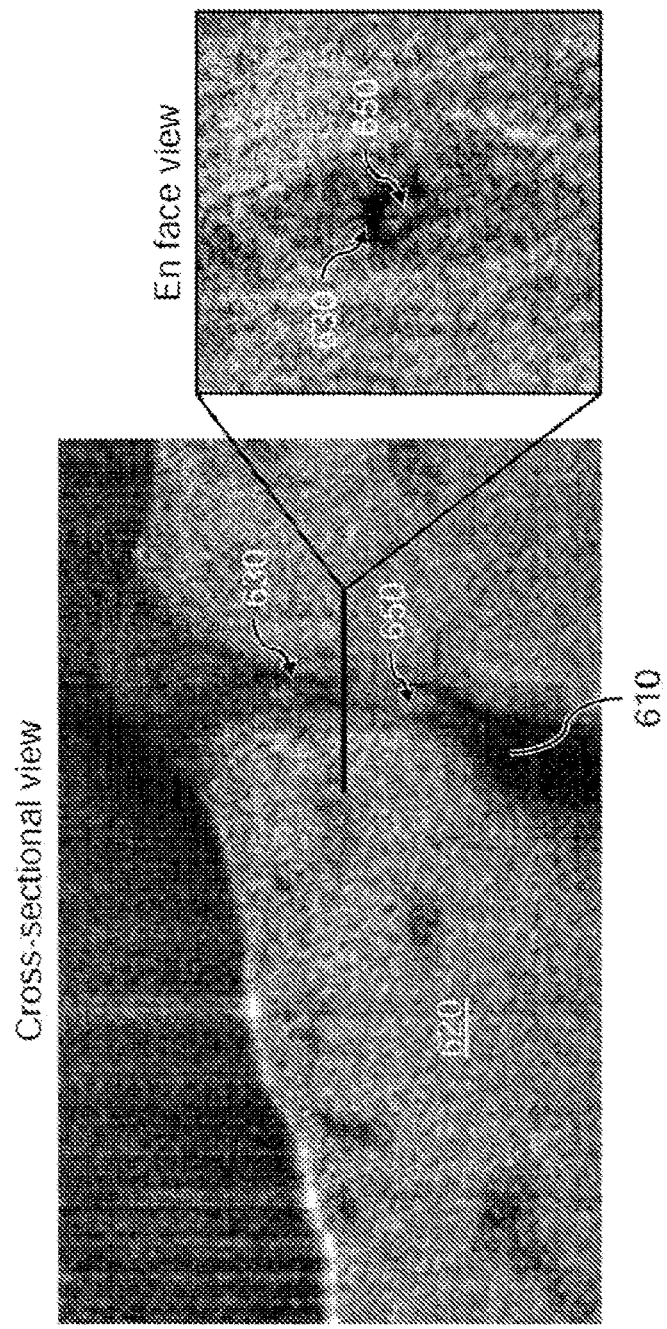
FIG. 6 is an exemplary μOCT image of porcine trachea showing mucus extrusion in progress.

FIG. 6 shows exemplary results of images from the exemplary µOCT imaging procedure of ex vivo porcine trachea tissue. Besides functional anatomy at airway surface, mucus gland and gland duct 610 within lamina propria 620 can also be seen in the exemplary µOCT images. A thin liquid layer 630 at the duct surface can be seen surrounding the mucus 650. 3D reconstruction of the exemplary µOCT image allows estimation of the gland duct cross-sectional area in the mucus transport, so that mucus transport rates of luminal contents can be estimated by multiplying the gland duct cross-sectional area with the longitudinal extrusion rates of mucus estimated from the real-time cross-sectional images.

Figure 7:
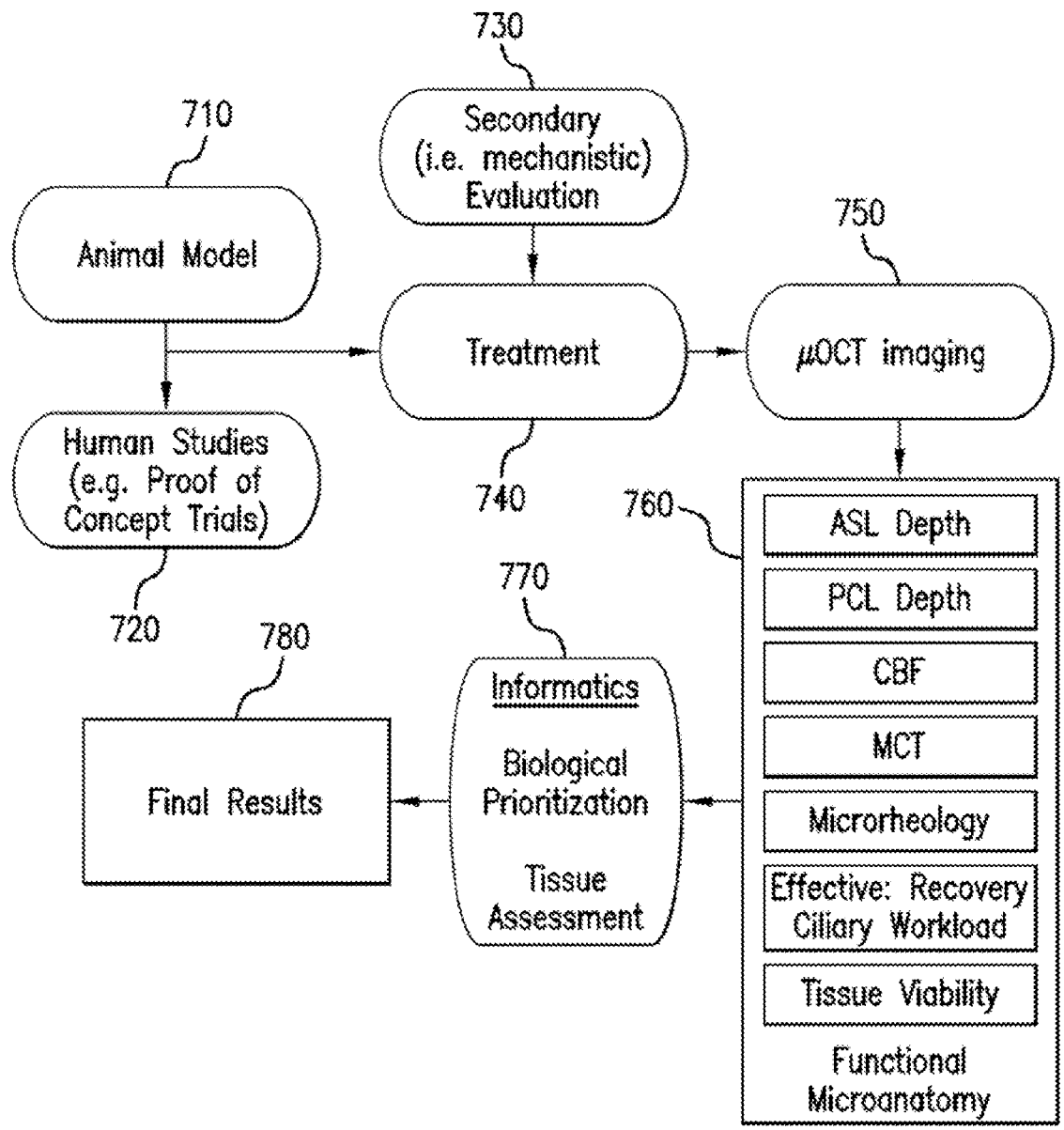
FIG. 7 is a flow diagram for analyzing intact tissue using the μOCT methods, systems, arrangements and computer-accessible medium in accordance with present disclosure.

An exemplary application of µOCT technology for intact tissue analysis is illustrated in FIG. 7, the exemplary procedures of which are provided below.

For example, in block 710, animal models, including but not limited to genetic or exposure induced models of disease are generated. In block 720, studies involving human subjects in the context of proof of concept clinical trials are obtained and/or utilized. In block 730, a treatment with compounds selected for secondary evaluation and/or mechanistic studies is performed. In block 740, experimental treatment is conducted, and in block 750, µOCT imaging can be performed. Block 750 can be performed in vivo (via an endoscopic or rigid µOCT probe) or ex vivo (in the case of animal studies requiring sacrifice and extraction of tissues) imaging. In block 760, exemplary µOCT based endpoints can then be derived, and in block 770, data can then be prioritized and analyzed based on the biological question to be addressed and an informatics system to handle redundant data, ultimately resulting in final results in block 780.

Figure 8:
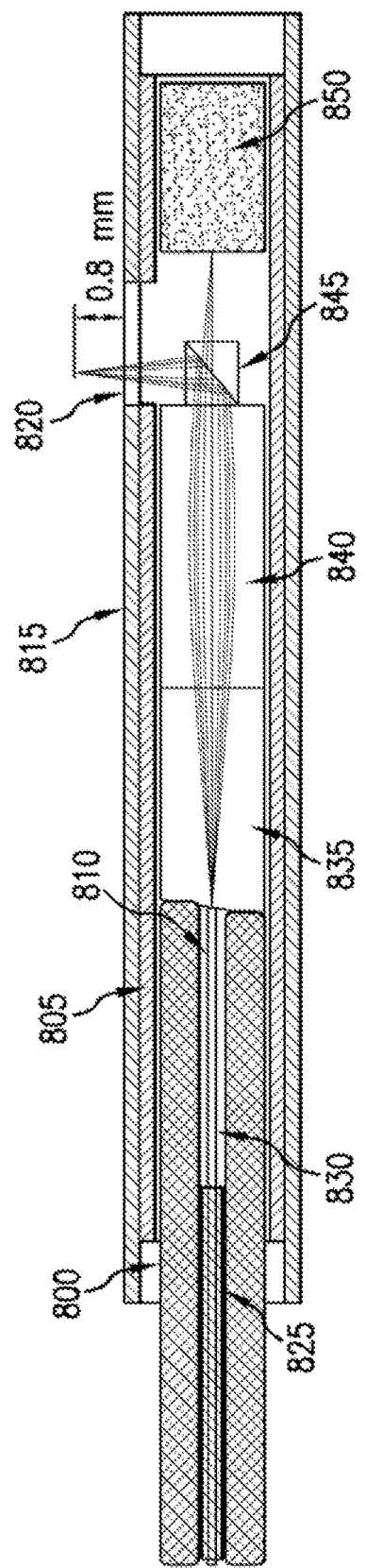
FIG. 8 is a diagram of an exemplary embodiment of a probe used to perform the μOCT procedure on airway tissue, such as in the nose (rhinoscopy) according to the present disclosure.

For the exemplary in vivo µOCT imaging, an exemplary probe should be used to provide imaging access to the tissue of analysis. A diagram of an exemplary embodiment of a µOCT probe is shown in FIG. 8. This exemplary probe can be used in the human nose (rhinoscopy). The exemplary probe can be contained within an outer tube (815) that remains statically positioned relative to the object or tissue to be imaged. The optical components of the exemplary probe can be mounted within an inner shuttle tube (805), and mechanically driven in a longitudinal fashion relative to the outer tube via a rigid drive shaft (800). The optical fiber (830) can deliver illumination into and collects reflected light from the imaging probe. The fiber can be mechanically fixed to the drive shaft by the ferrule (810). A 2 mm spacer (835) can facilitate a divergence of the light from the fiber before collimation and focusing by the gradient-index lens (840). The beam splitter (845) can comprise a glass cube with a diagonal reflective surface with a small elliptical region in the center that transmits light. This transmitted portion can be incident on a reflector (850), which can serve as the reference mirror for OCT. The light reflected from the beamsplitter can be directed through a transparent window in the outer tube (820) towards the object or tissue to be imaged.

Figure 9:
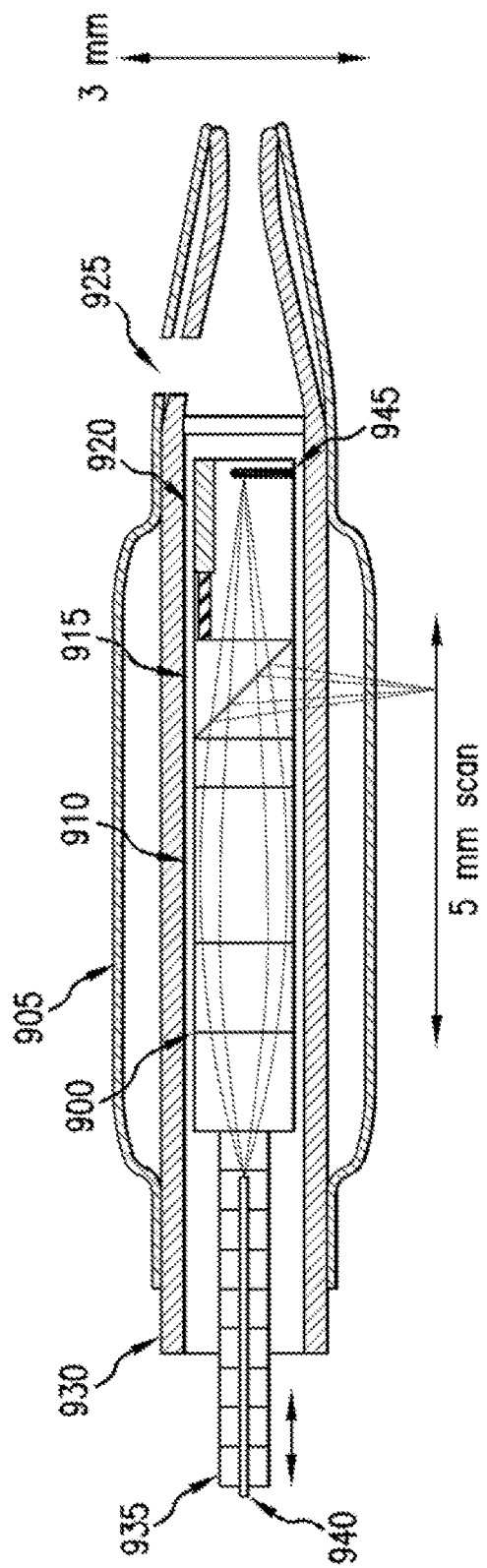
FIG. 9 is a diagram of another exemplary embodiment of the probe used to perform the μOCT procedure on airway tissue that is stabilized against the airway lumen using a wire basket according to the present disclosure.

A diagram of another exemplary embodiment of the µOCT probe is shown in FIG. 9. This exemplary probe of FIG. 9 can also be used in human or animal airways. The optical components can be contained within a sheath (930) and stabilized against the lumen of the airway to be imaged by a wire basket (905). An optical fiber (940) can deliver illumination into and collects reflected light from the imaging probe. The fiber can be mechanically fixed to a drive shaft (935), which can provide longitudinal scanning of the optics within the sheath. The illumination from the fiber 940 can be collimated in a hollow-centered pattern by means of a double-axicon GRIN lens (900), and then focused by a conventional GRIN lens (910). A beamsplitter (915) can reflect a portion of the illumination light towards the object or tissue to be imaged, and can facilitate the remaining light to be transmitted to a reference mirror (945), which can be attached to a linear actuator (920) to facilitate for a positional adjustment. The beamsplitter can also combine the light/beam/radiation reflected from the reference mirror and the sample.

Figure 10:
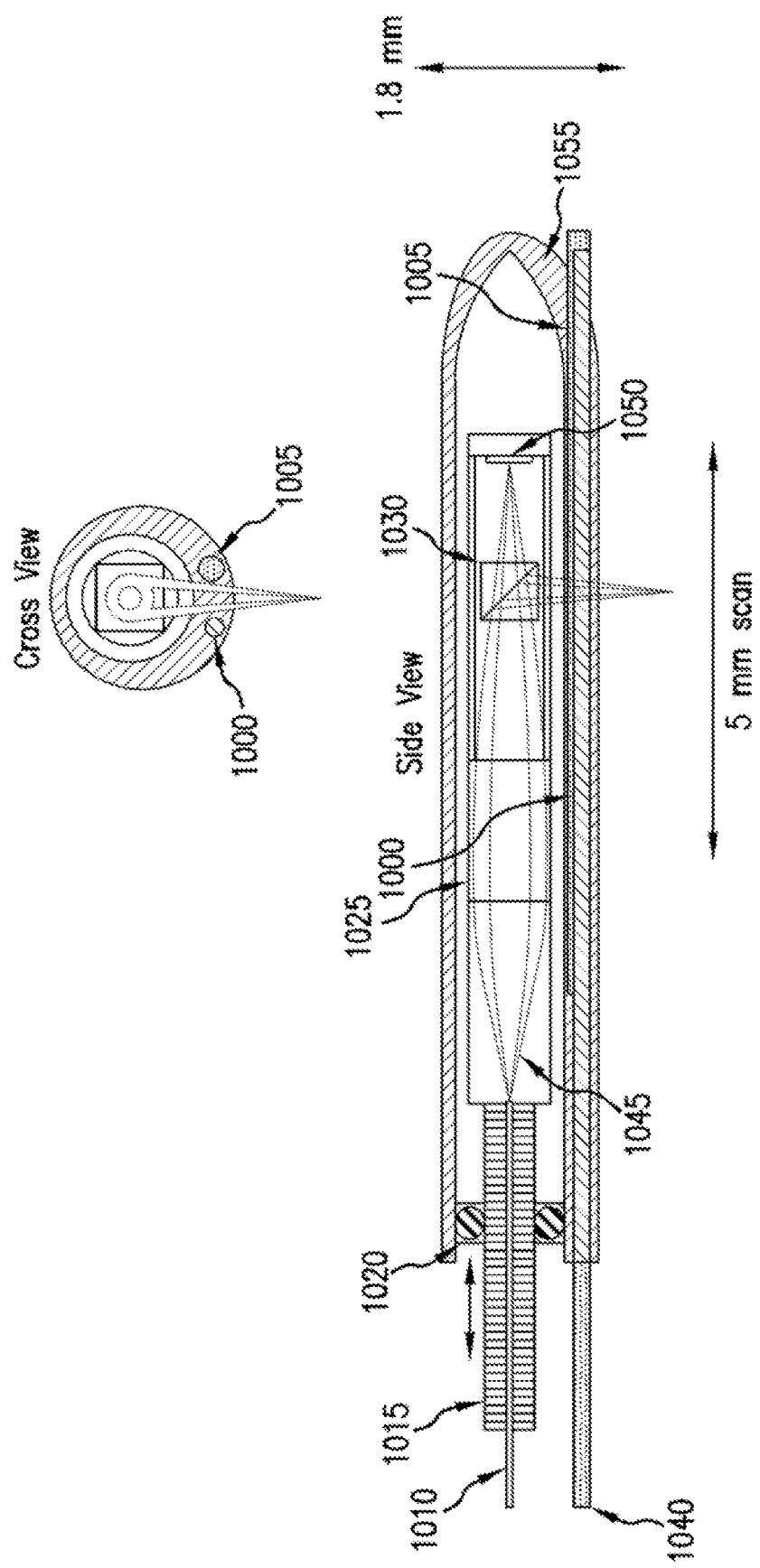
FIG. 10 is a diagram of still another exemplary embodiment of the probe used to perform the μOCT procedure on airway tissue, and includes a perfusion channel and an electrode for the purpose of potential difference (PD) measurement according to the present disclosure.

A diagram of yet another exemplary embodiment of the µOCT probe is shown in FIG. 10. This exemplary probe of FIG. 10 can also be used in human or animal airways, and contains the added features of a perfusion channel and electrode for performing electrical potential difference measurements. The optical components can be contained within an insulating sheath (1055). An optical fiber (1010) can deliver illumination into and collects reflected light from the imaging probe. The fiber can be mechanically fixed to a drive shaft (1015), which provides longitudinal scanning of the optics within the sheath. A bearing (1020) can center the shaft while enabling smooth linear motion of the shaft within the sheath. The illumination from the fiber is collimated in a hollow-centered pattern using a double-axicon GRIN lens (1045), and then focused by a conventional GRIN lens (1025). A beamsplitter (1030) can reflect a portion of the illumination light towards the object or tissue to be imaged, and can facilitate the remaining light to be transmitted to a reference mirror (1050). The beamsplitter can also combine the light reflected from the reference mirror and the sample. A perfusion channel (1000) can facilitate liquid solutions to be delivered to the end of the probe, and an electrode channel (1005) can facilitate electrical recordings to be made.

Figure 11:
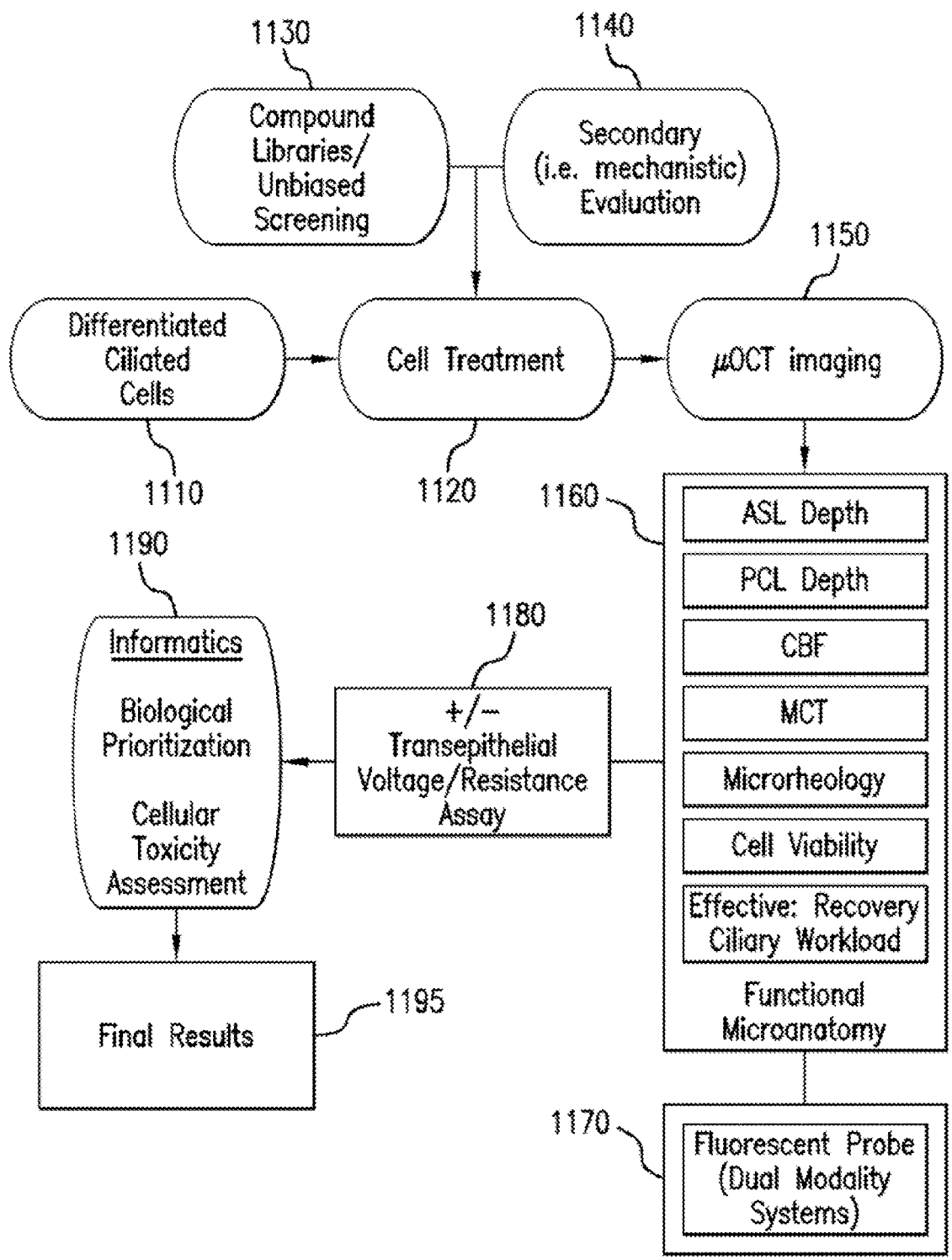
FIG. 11 is an overall flow diagram and configurational illustration for high throughput screening or secondary characterization application of the exemplary μOCT procedure according to the present disclosure.

One of the exemplary applications of the exemplary µOCT methods, systems, arrangements and computer-accessible medium in accordance with present disclosure is a high-throughput drug screening to analyze the effects of treatment compounds on respiratory epithelium. A high-throughput flow diagram of such exemplary application is shown in FIG. 11 and described as follows.

For example, in block 1110, a growth of differentiated airway cells on air liquid interface is followed. In block 1120, cells are treated with 1130 compound libraries, biologic libraries (e.g. siRNA, miRNA, etc.), alone and in combination with other agents. In addition, or instead of block 1130, in block 1140, compounds are selected which are chosen for known or proposed effects, prior screening hits, or mechanistic characterization. In block 1150, following appropriate incubation period with test compounds, cells are non-invasively imaged with the exemplary µOCT procedure using the exemplary HTS apparatus, with and without addition of known acute acting stimulants/inhibitors of ion transport for an additional test of additivity or specificity. In block 1160, output of the exemplary µOCT automated procedures are used—which are multiple distinct but complementary measures of functional microanatomy, including ASL depth, PCL depth, CBF, MCT, microrheology properties (including but not limited to viscosity), effective stroke to recovery stroke ratio of loaded cilia, and estimates of cell viability. For block 1170, in the case of dual modality imaging, fluorescent probes can also be assayed as an indicator of a molecular target, such as ion transport. In block 1180, subsequently, the cell culture plate can be transferred to a separate ion transport assay instrument, capable of measuring transepithelial voltage, transepithelial resistance, and calculating equivalent current, each traditional measures of transepithelial ion transport, which can be combined with OCT-based studies as an independent test in the same wells. In block 1190, data can then be prioritized and analyzed based on the biological question to be addressed and an informatics system to handle redundant data, ultimately resulting in final results in block 1195.

Figure 12:
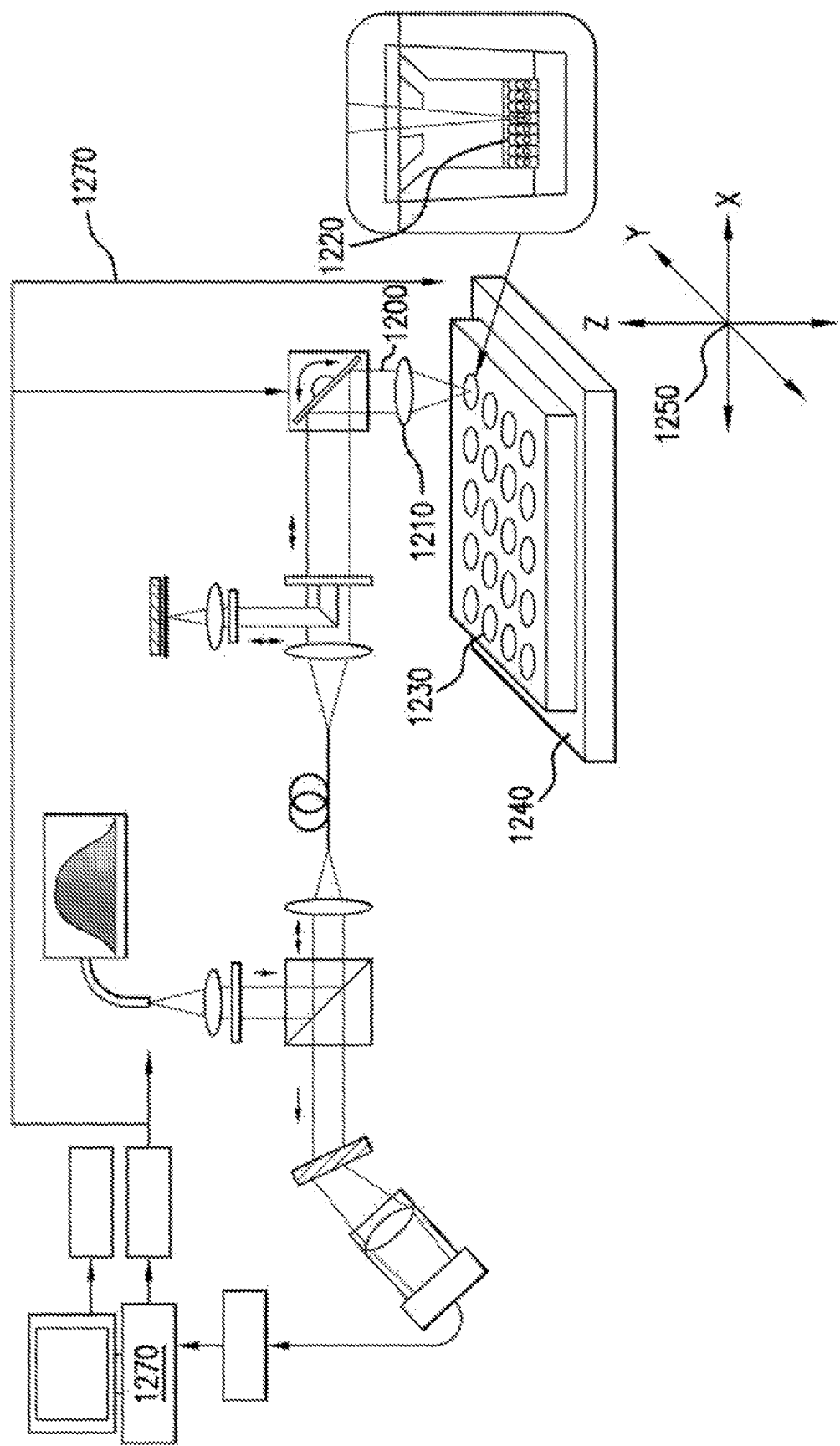
FIG. 12 is a diagram of an exemplary embodiment of an upright μOCT imaging system for high-throughput screening of biological compounds according to the present disclosure.

FIG. 12 shows a diagram of an exemplary embodiment of a high-throughput screening configuration using the exemplary µOCT system illustrated in FIG. 1. In this exemplary embodiment, the apodized light from the galvanometer scanning mirrors 1200 can be focused by an objective lens 1210 onto a sample on the apical side of a growth substrate insert such as a filter 1220 placed in an m×n multi-chambered plate 1230. The m×n plate can be supported by an automated plate moving system 1240 which is motorized and capable of moving the multi-chambered plate in three physical dimensions 1250 such that the light focused by the objective lens 1210 can interrogate multiple samples contained in the multi-chambered plate 1230. Output signals 1260 from a computer 1270 can be used to control the movement of automated plate mover 1215. The computer 1270 can be used to process images according to an exemplary procedure and grade the effectiveness of each compound added to the biological sample.

Figure 13:
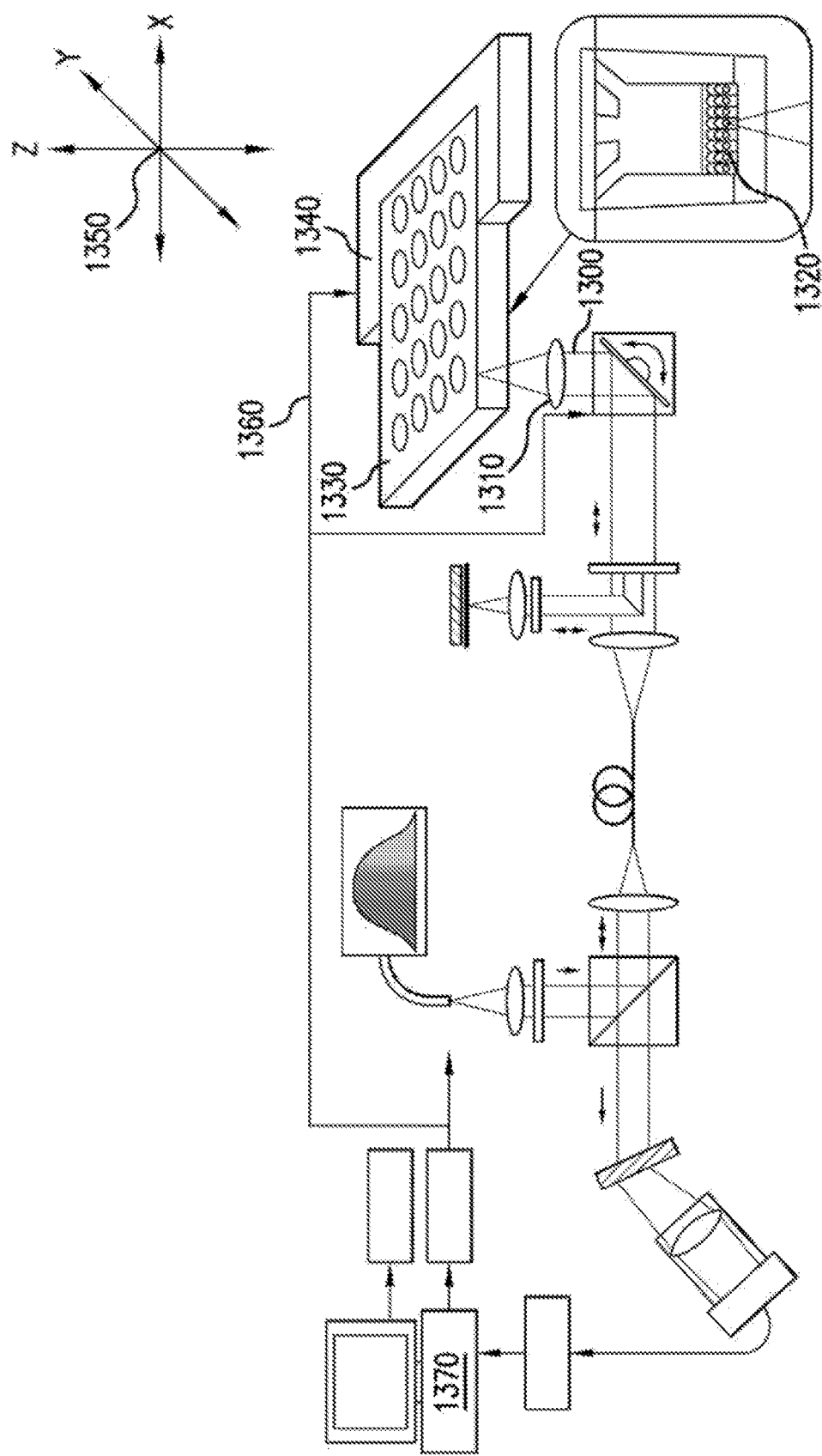
FIG. 13 is a diagram of an exemplary embodiment of an inverted μOCT imaging system for high-throughput screening of biological compounds according to the present disclosure.

FIG. 13 shows a diagram of another exemplary embodiment of a high-throughput screening system which can utilize the exemplary system of FIG. 1. In FIG. 13, the apodized light from the galvanometer scanning mirrors 1300 can be focused by an objective lens 1310 onto a sample on the basolateral side of a growth substrate insert, such as a filter 1320 placed in an m×n multi-chambered plate 1330. The m×n plate can be support by an automated plate moving system 1340 which can be motorized and capable of moving the multi-chambered plate in three physical dimensions 1350 such that the light focused by the objective lens 1310 interrogates multiple samples contained in the multi-chambered plate 1330. Output signals 1360 from a computer 1370 can be used to control the movement of automated plate mover 1315. The computer 1370 can be used to process images according to an exemplary procedure and grade the effectiveness of each compound added to the biological sample.

Figure 14:
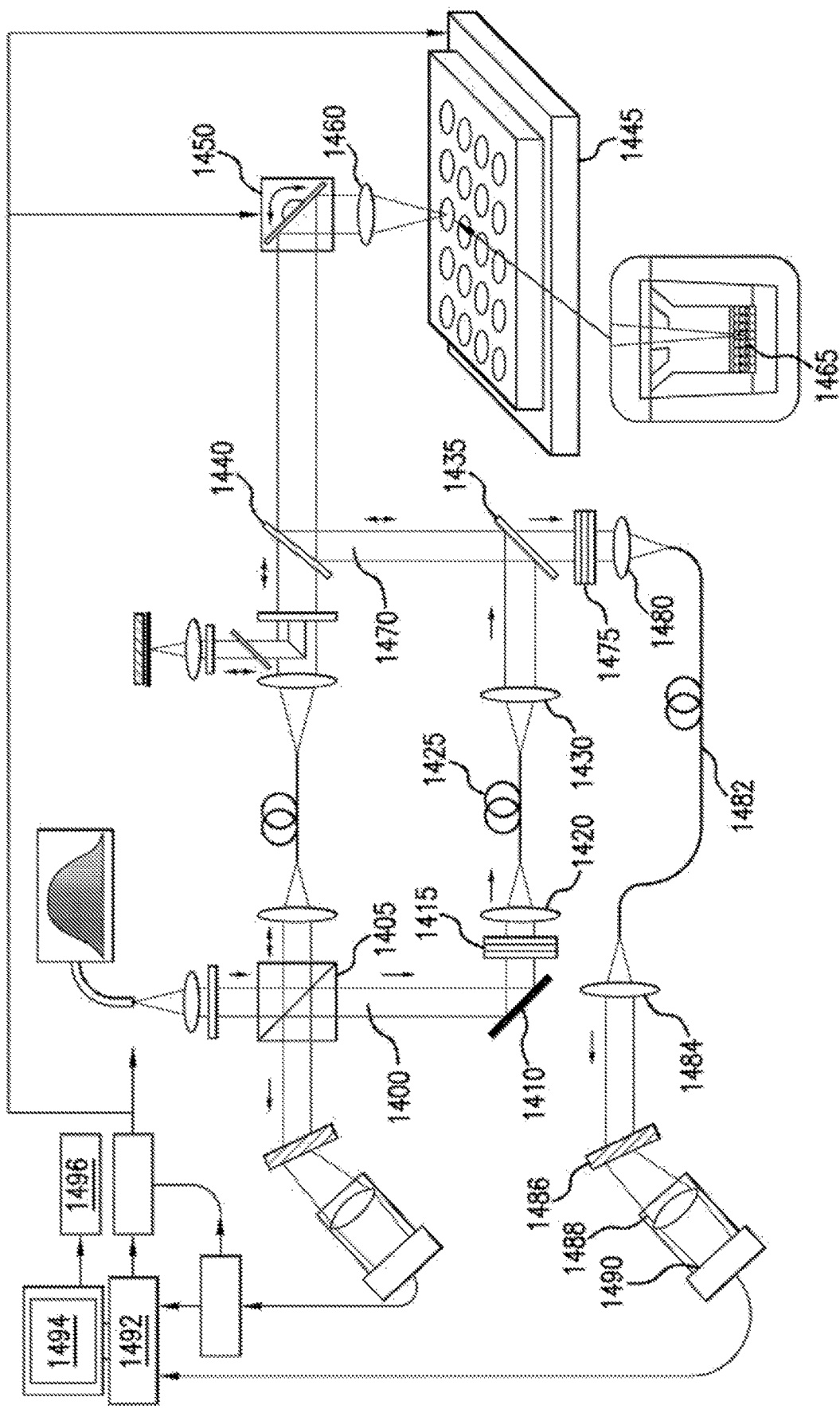
FIG. 14 is a diagram of an exemplary embodiment of an upright dual-modality μOCT/Fluorescence microscopy imaging system for high-throughput screening of biological compounds according to the present disclosure.

According to another exemplary embodiment of the present disclosure, FIG. 14 illustrates a diagram of the exemplary system shown in FIG. 12 and modified such that an additional optical path is implemented to provide fluorescence excitation light to a biological sample. In particular, the additional path begins with broadband light/beam/radiation 1400 having been transmitted through the beam splitter 1405 and directed by a mirror 1410 through an excitation filter 1415 before being focused by a lens 1420 onto a single mode fiber optic patch cable 1425. The light/beam/radiation transmitted by the fiber optic cable 1425 can be re-collimated by a lens 1430 and directed by dichroic mirrors 1435 and 1440 into a common optical path as the exemplary embodiment in FIG. 12. The combined light can be directed by a scanning galvanometer 1450 through a focusing objective lens 1460 onto the apical side of a biological sample 1465 as in the exemplary embodiment of the system shown in FIG. 12. The light/beam/radiation reflected by the sample can be collected by the objective lens 1460 and separated into a fluorescence path 1470 and µOCT path by dichroic mirror 1440. The fluorescence light/beam/radiation can be further separated from the source light by dichroic mirror 1435 before passing through emission filters 1475 and being focused by lens 1480 onto the entrance pupil of fiber optic patch cable 1482. Fluorescence light/beam/radiation transmitted by the fiber optic patch cable 1482 can be re-collimated by a lens 1484 and split into its component spectral frequencies by a diffraction grating 1486 which are then focused by a lens 1488 onto a detection array 1490. Information from the detection array 1490 can be transmitted to a computer 1492 that processes the fluorescence information for display 1494 and storage 1496.

Figure 15:
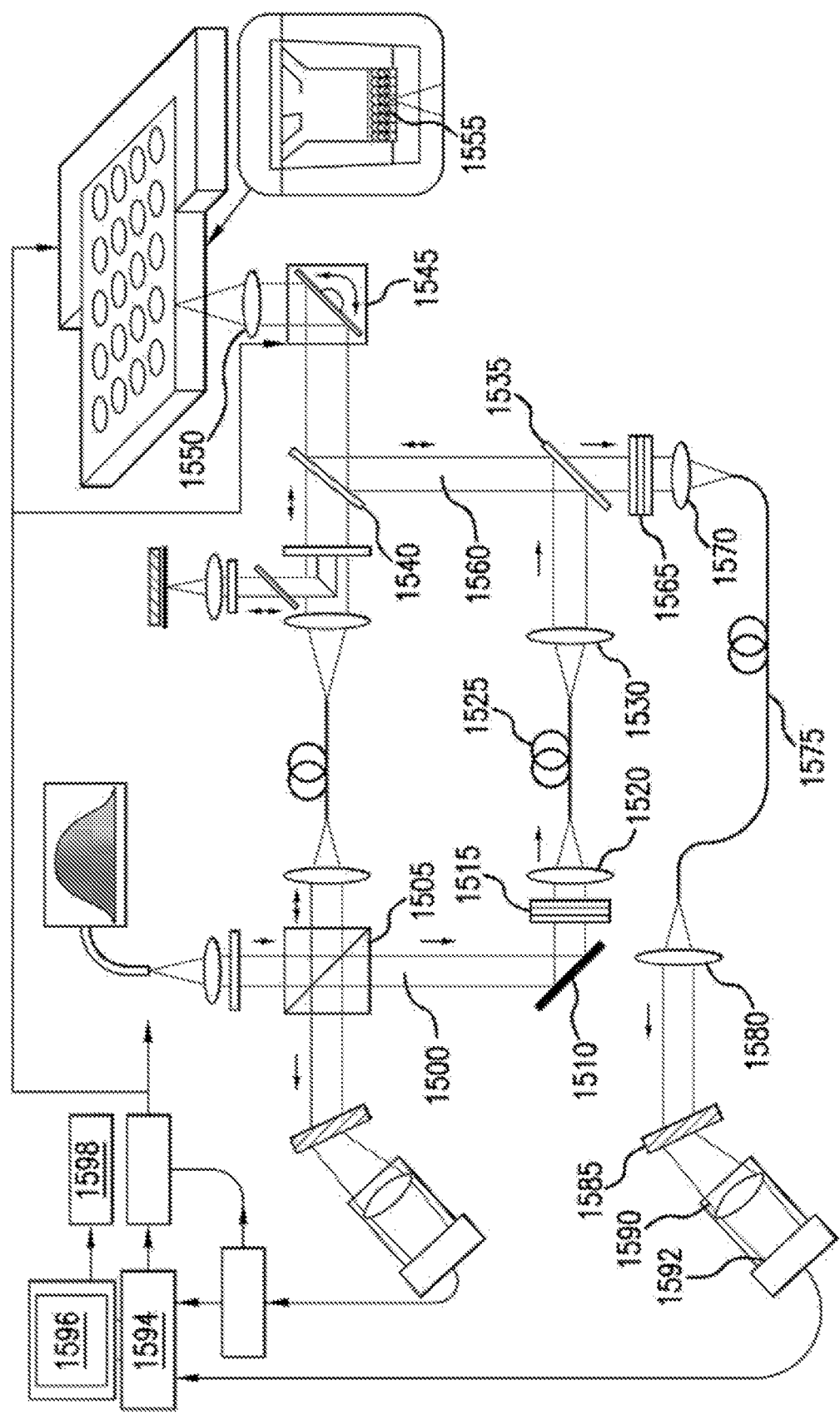
FIG. 15 is a diagram of an exemplary embodiment of an inverted dual-modality μOCT/Fluorescence microscopy imaging system for high-throughput screening of biological compounds according to the present disclosure.

Another exemplary embodiment of a dual-modality fluorescence µOCT system according to the present disclosure is shown in FIG. 15, which illustrates an alternate exemplary configuration of the system shown in FIG. 14 as an inverted imaging system (which is also a modification of the exemplary system in FIG. 13). For example, an additional optical path can be implemented to provide fluorescence excitation light to a biological sample. The additional path begins with broadband light/beam/radiation 1500 having been transmitted through the beam splitter 1505 and directed by a mirror 1510 through an excitation filter 1515 before being focused by a lens 1520 onto the entrance pupil of a single mode fiber optic patch cable 1525. The light/beam/radiation transmitted by the fiber optic cable 1525 can be re-collimated by a lens 1530 and directed by dichroic mirrors 1535 and 1540 into a common optical path as the exemplary embodiment of the system shown in FIG. 13. The combined light/beam/radiation can be directed by a scanning galvanometer 1545 through a focusing objective lens 1550 onto the basolateral side of a biological sample 1555, similarly to the exemplary embodiment of the system shown in FIG. 13. The light/beam/radiation reflected by the sample can be collected by the objective lens 1550, and separated into a fluorescence path 1560 and µOCT path by dichroic mirror 1540. The fluorescence light/beam/radiation can further be separated from the source light by dichroic mirror 1535 before passing through emission filters 1565 and being focused by lens 1570 onto the entrance pupil of fiber optic patch cable 1575. Fluorescence light/beam/radiation transmitted by the fiber optic patch cable 1575 can be re-collimated by a lens 1580, and split into its component spectral frequencies by a diffraction grating 1585 which are then focused by a lens 1590 onto a detection array 1592. Information from the detection array 1592 can be transmitted to a computer 1594 that processes the fluorescence information for display 1596 and storage 1598.

Figure 16B:
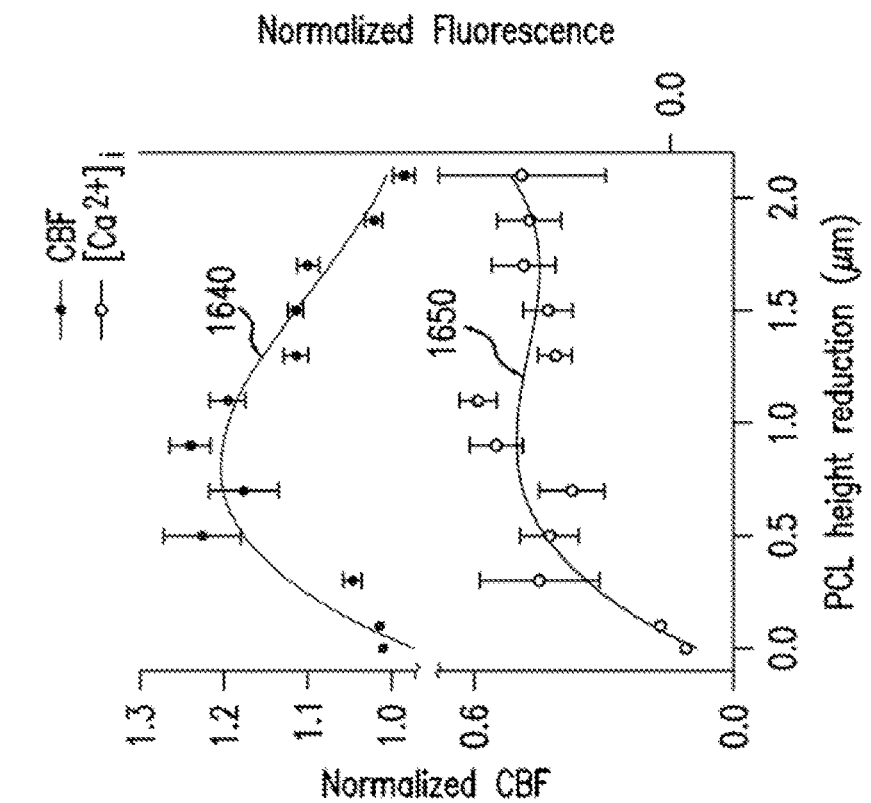
FIGS. 16a and 16b are graphs of exemplary results from a dual-modality μOCT/Fluorescence microscopy imaging system that demonstrate simultaneously combinable measurements based on both modalities.
Figure 16A:
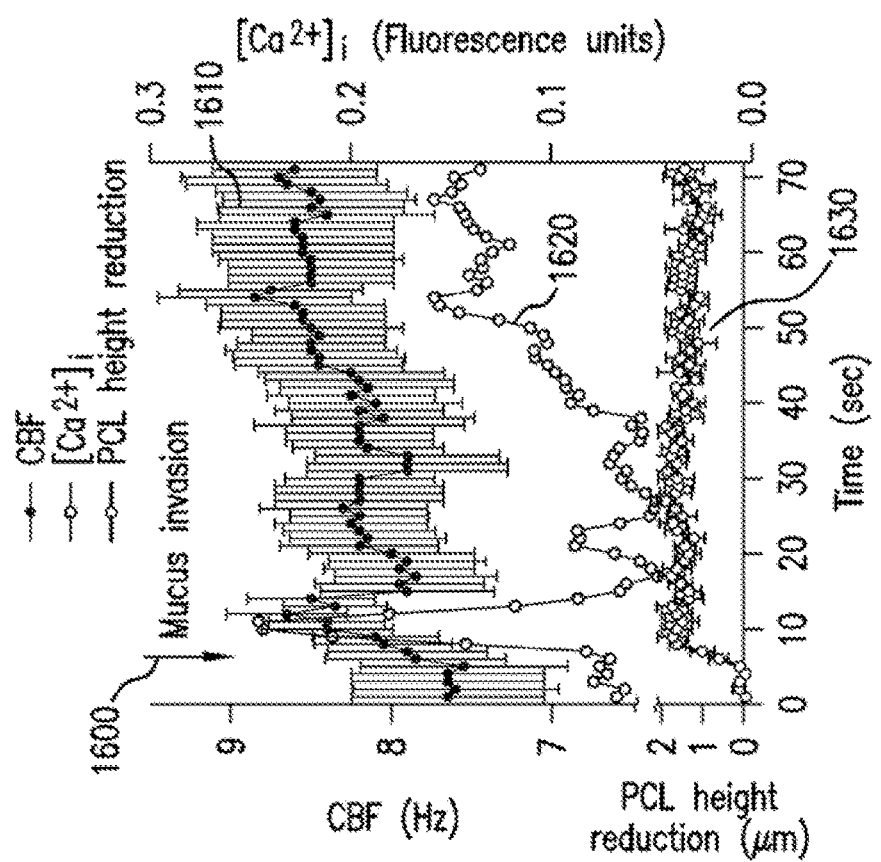

A graph of exemplary results combining data from both fluorescence microscopy and µOCT in a dual-modality configuration is shown in FIG. 16A. An experiment was conducted on a HBE cell culture in which the unloaded cells receive a sudden impact of mucus (1600) while imaged simultaneously with µOCT and fluorescence microscopy. The µOCT images were used to determine ciliary beat frequency (1610) and PCL depth reduction (1630), while intracellular calcium ion concentration is revealed by a fluorescent assay. From 1-5 seconds, the PCL height, CBF and calcium were at the basal condition. Between 6-7 sec, 10 µL of mucus acquired from a normal subject reached the epithelial surface. For CBF measurements, N=5 per time point, with error bars showing the standard error of the mean (SEM). For the PCL height reduction measurements, N=6/time point, ±SEM. These results demonstrate that PCL height reduction by the exogenous mucus load increases intracellular calcium concentration and ciliary beat frequency in these cell cultures. FIG. 16B illustrates an exemplary graph of a correlation between the normalized CBF (1640) and normalized intracellular calcium concentration (1650) with respect to PCL height reduction. N=322 observations were made during five mucus invasion experiments each lasting 50~100 sec. Each observation was normalized to the mean baseline value of the experiment.

Figure 17:
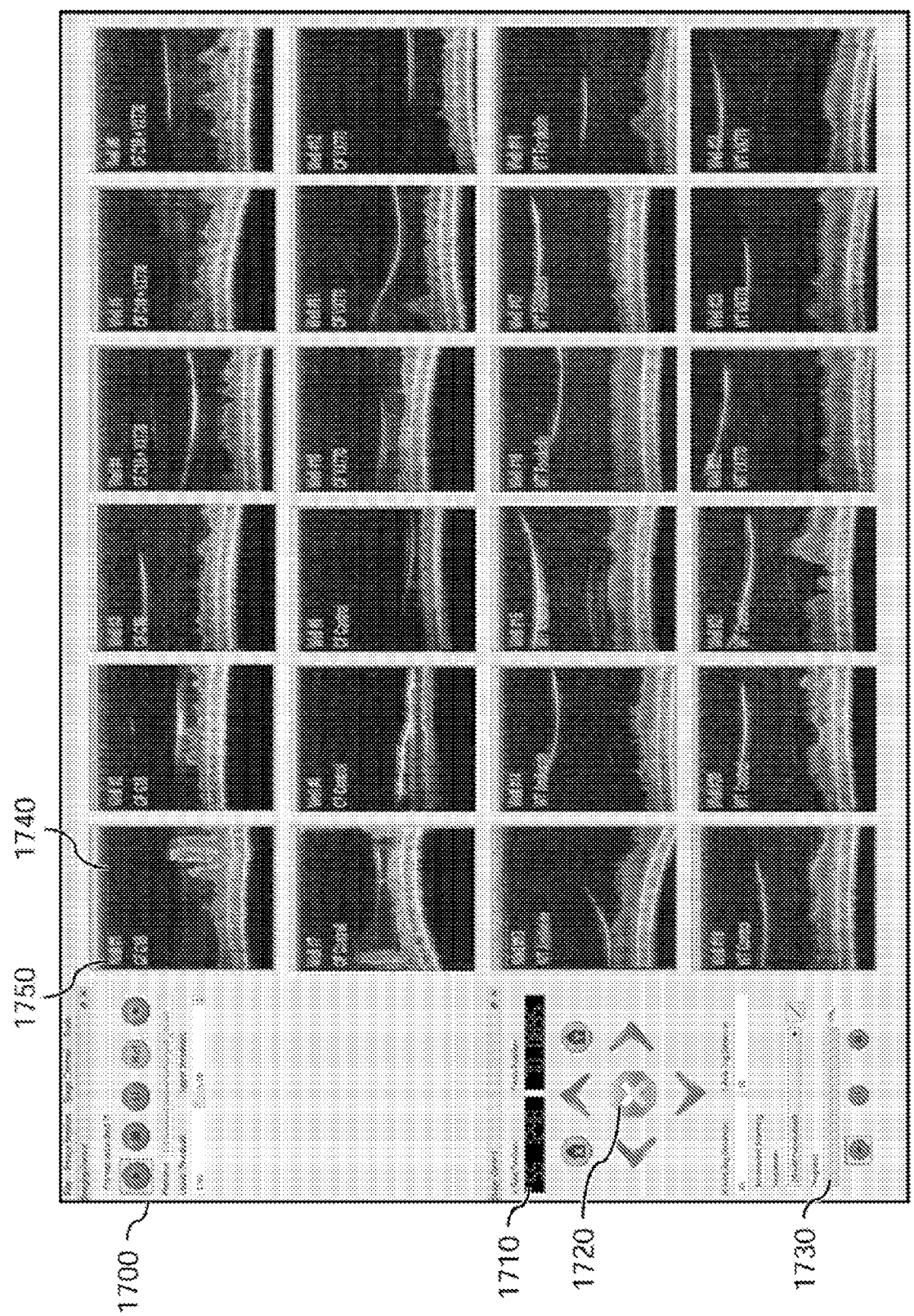
FIG. 17 is an illustration of an exemplary embodiment of high-throughput drug screening device software graphical user interface of an exemplary embodiment of μOCT imaging system high-throughput drug screening device.

The exemplary high-throughput screening exemplary embodiments of the present disclosure described herein can include a computer workstation for system control and image acquisition. An exemplary interface of the user control and display system is shown in FIG. 17. For example, the user can regulate the automated scanning process with a series of controls 1700. The location of the scanning light/beam/radiation relative to an arbitrary home position 1710 is displayed and the user can provide manual commands with position controls 1720. The progress 1730 of the automated scanning is also provided to the user. Exemplary µOCT images can be displayed in one or more viewing windows 1740 in which additional information about the sample being scanned can be displayed 1750.

After the exemplary acquisition, analysis can be performed on the series of images from each position to produce the metrics relevant to the evaluation of the compound under study. This disclosure can include automated procedures employed to determine airway surface liquid depth, mucociliary transport rate, and ciliary beat frequency from the exemplary µOCT image data.

Figure 18:
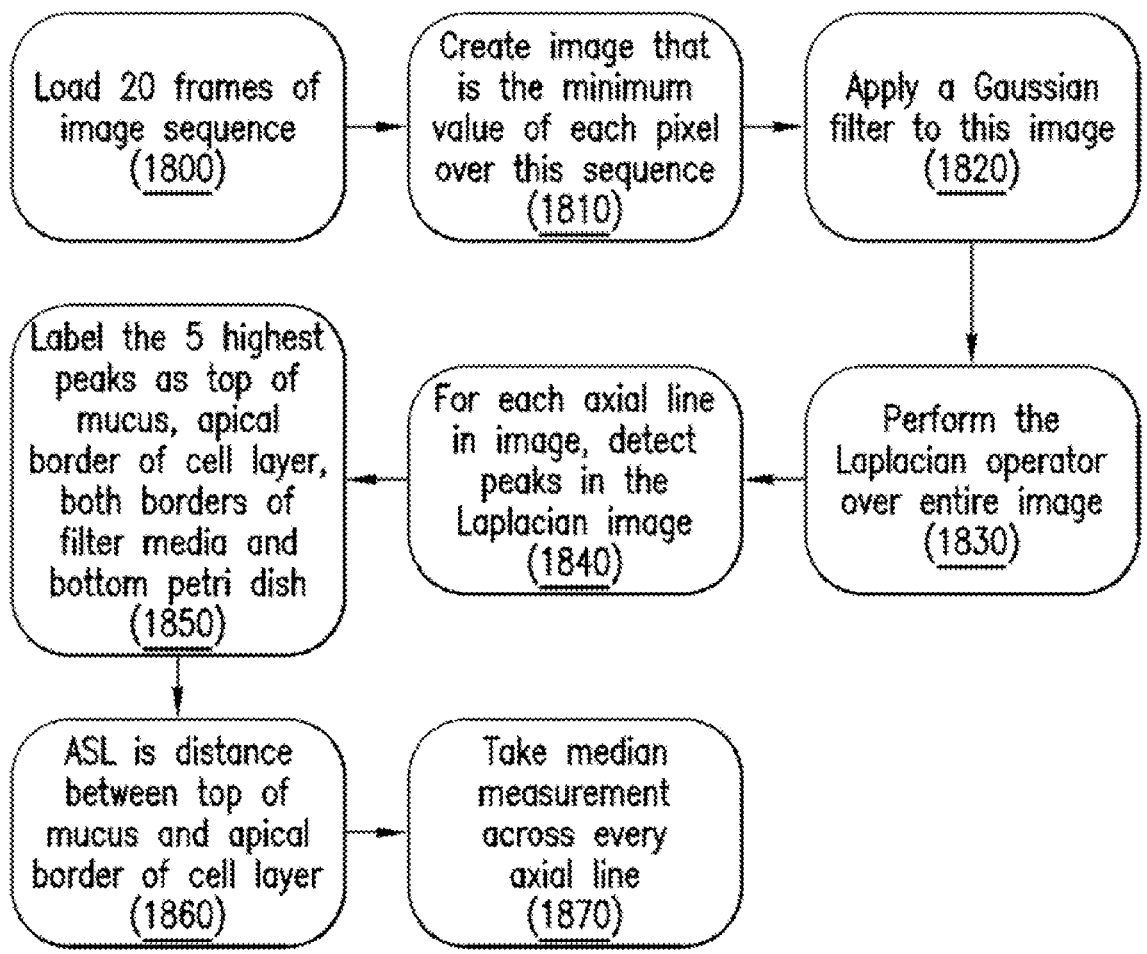
FIG. 18 is a flow diagram of a procedure for determining airway surface liquid depth in μOCT images of respiratory epithelium according to an exemplary embodiment of the present disclosure.

FIG. 18 shows a flow diagram of an exemplary embodiment of a method and a procedure for an automated airway surface liquid (ASL) depth measurement according to the present disclosure. The ASL depth is the distance in microns from the apical border of the cell layer to the top of the mucus secretion. The first block 1800 can be to load a sequence of 20 consecutive images of the HBE cells. The second block 1810 can be to create a new image which has the minimum value at each pixel over these 20 frames. This exemplary step can mitigate the possibility of transient noise and flowing microparticles incorrectly being classified as edges. Steps 1820 and 1830 can perform a Laplacian of Gaussian (LoG) operation on the processed image, a standard edge detection algorithm. In block 1840, each axial line in the resultant LoG image is considered independently and a peak detection procedure can be applied. For example, the 5 highest unique peaks detected are labeled from top to bottom as the top of mucus layer, apical border of cell layer, top border of filter media, bottom border of filter media and bottom petri dish (block 1850). In block 1860, the ASL depth for each axial line can be calculated as the distance between the top of mucus layer and the apical border of the cell layer via the known conversion between pixels and microns, using the approximation that mucus has the same refractive index as water. Finally, in block 1870, the overall ASL depth can be computed as the median value across all axial lines in the image.

Figure 19:
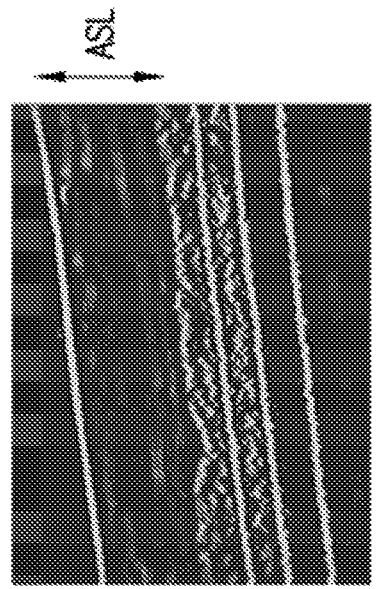
FIG. 19 are certain exemplary intermediate processing procedures and exemplary results from exemplary automated ASL depth finding procedure according to an exemplary embodiment of the present disclosure.
Figure 19:
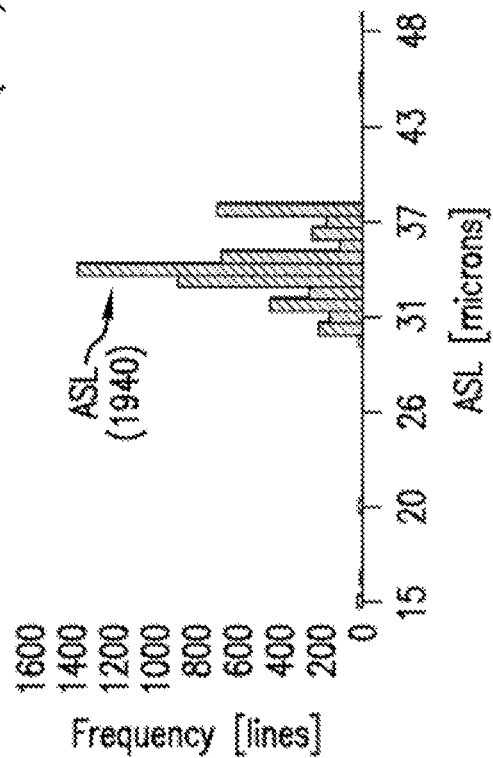
Figure 19:
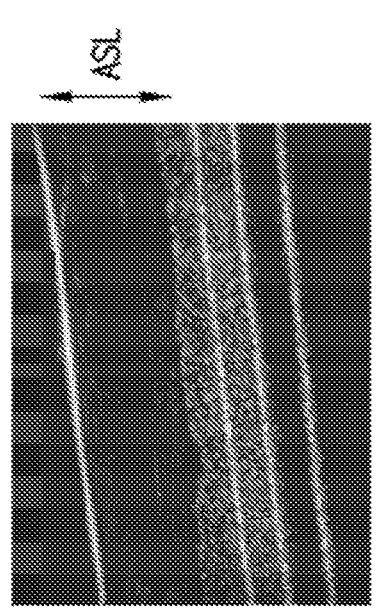
Figure 19:
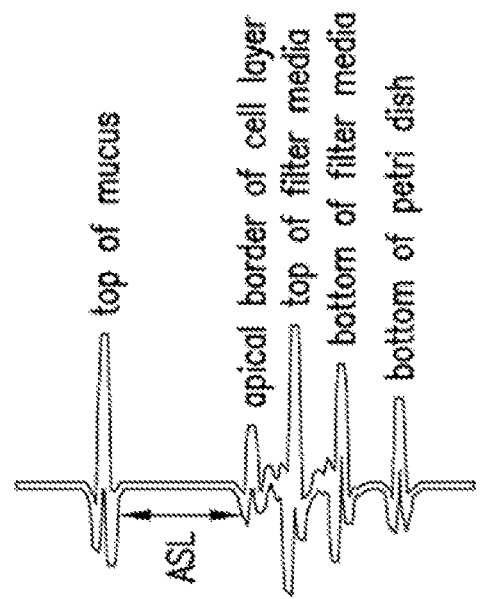

Exemplary results from the exemplary ASL depth automated procedure are shown in FIG. 19. For example, in FIG. 19, an image 1900 is an exemplary minimum intensity image over 20 frames. The intensity and number of flowing microparticles in the mucus can be greatly reduced by the minimum operation. An image 1910 is an exemplary result of a Laplacian of Gaussian operation. The high intensity regions of this image now correspond to edges in the previous image. In a procedure 1920, the values of an exemplary single axial line of the Laplacian of Gaussian image are plotted, showing, e.g., 5 distinct peaks corresponding to the 5 repeatable edges in the original image. The exemplary distance between the apical cell border and top of mucus peaks is measured and collated in a procedure 1930, showing a distribution of ASL depths. The final exemplary ASL depth 1940 can be recorded as the median of this distribution.

Figure 20:
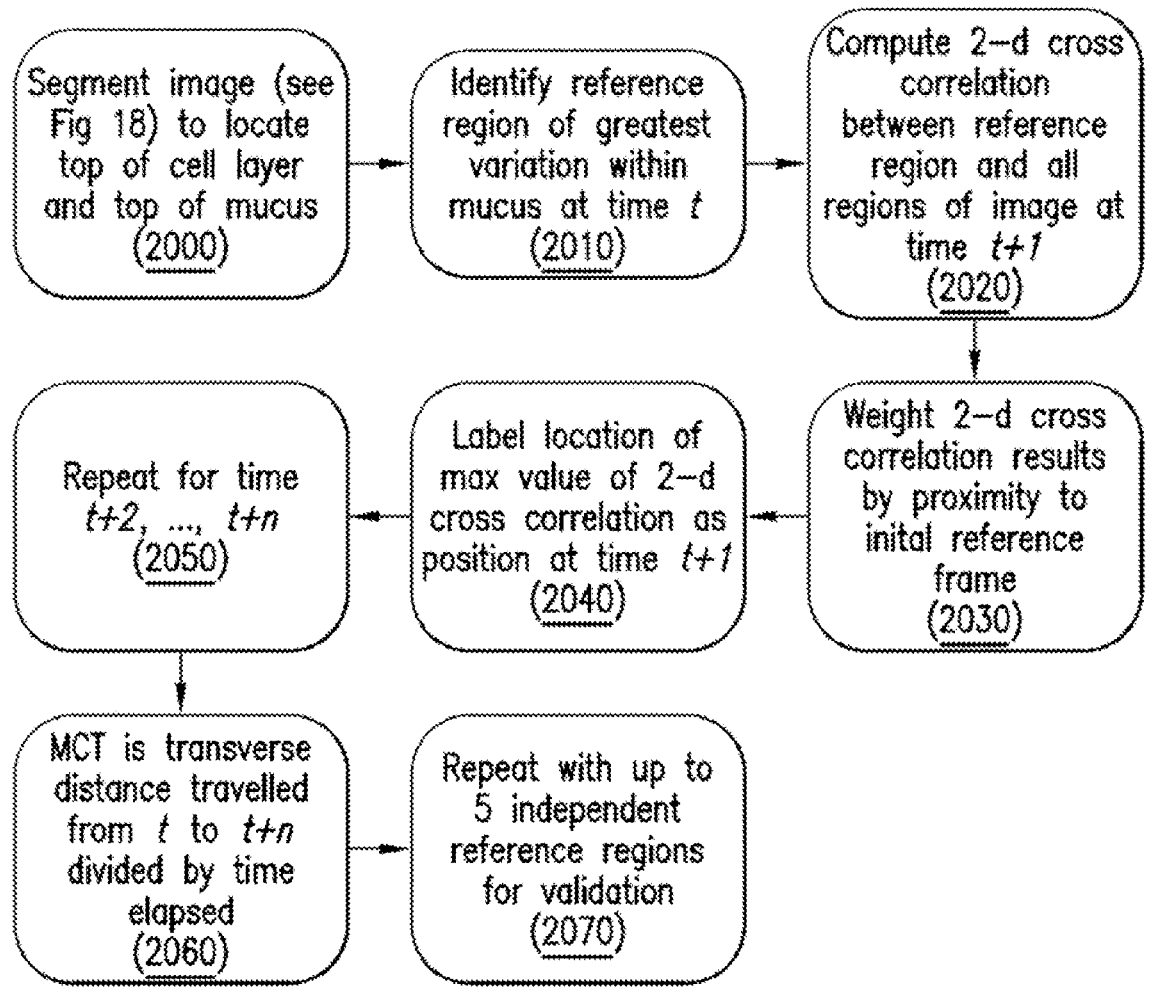
FIG. 20 is a flow diagram of a procedure used to determine a mucociliary transport rate (MCT) from μOCT images of respiratory epithelium according to an exemplary embodiment of the present disclosure.

FIG. 20 illustrates a flow diagram of an exemplary method and/or procedure for automated mucociliary transport rate (MCT) measurement according to an exemplary embodiment of the present disclosure. For example, the first block 2000 is provided to locate the apical surface of the cell layer and top of mucus layer of the image at time t=0, utilizing the exemplary ASL procedure described herein with respect to FIG. 18. The image can be cropped to limit the region of interest to the mucus between these two borders. Within this mucus, the image can be sampled in, e.g., 40×40 pixel regions to find the region that exhibits the greatest variance in pixel intensity (block 2010). Regions of greatest variance are the easiest to track across multiple frames. This region from time t=0 is called the reference image. In block 2020, a 2d cross-correlation can be performed between the reference image and all possible locations within the mucus region of interests at time t=1. Positive values of the cross-correlation matrix can indicate high similarity between the reference image at time t=0 and the new location at time t=1.

This exemplary cross-correlation matrix can be modified by multiplying each value by a weighting function representing the distance between the reference image and the new location, as the position of the reference image at time t=1 is likely to be close to its position at t=0. The weighting function used can be a Gaussian kernel. The location corresponding to the maximum value of this weighting cross-correlation matrix can be chosen at the most likely position for the reference image at time t=1 (step 2040). This process can be repeated in block 2050 to time t=n, where n is at most 2 seconds. (If the desired tracking length is longer than 2 seconds, a new reference image is found, repeating the algorithm from block 2010 due to the tendency for particles to move out of plane.) In block 2060, the exemplary MCT can be calculated as the transverse distance traveled from time t=0 to t=n divided by the time elapsed over that period. This process can be repeated using, e.g., 5 different initial reference images at different starting times (block 2070). If results are not comparable (within 80%), a manual review may be needed.

Figure 21:
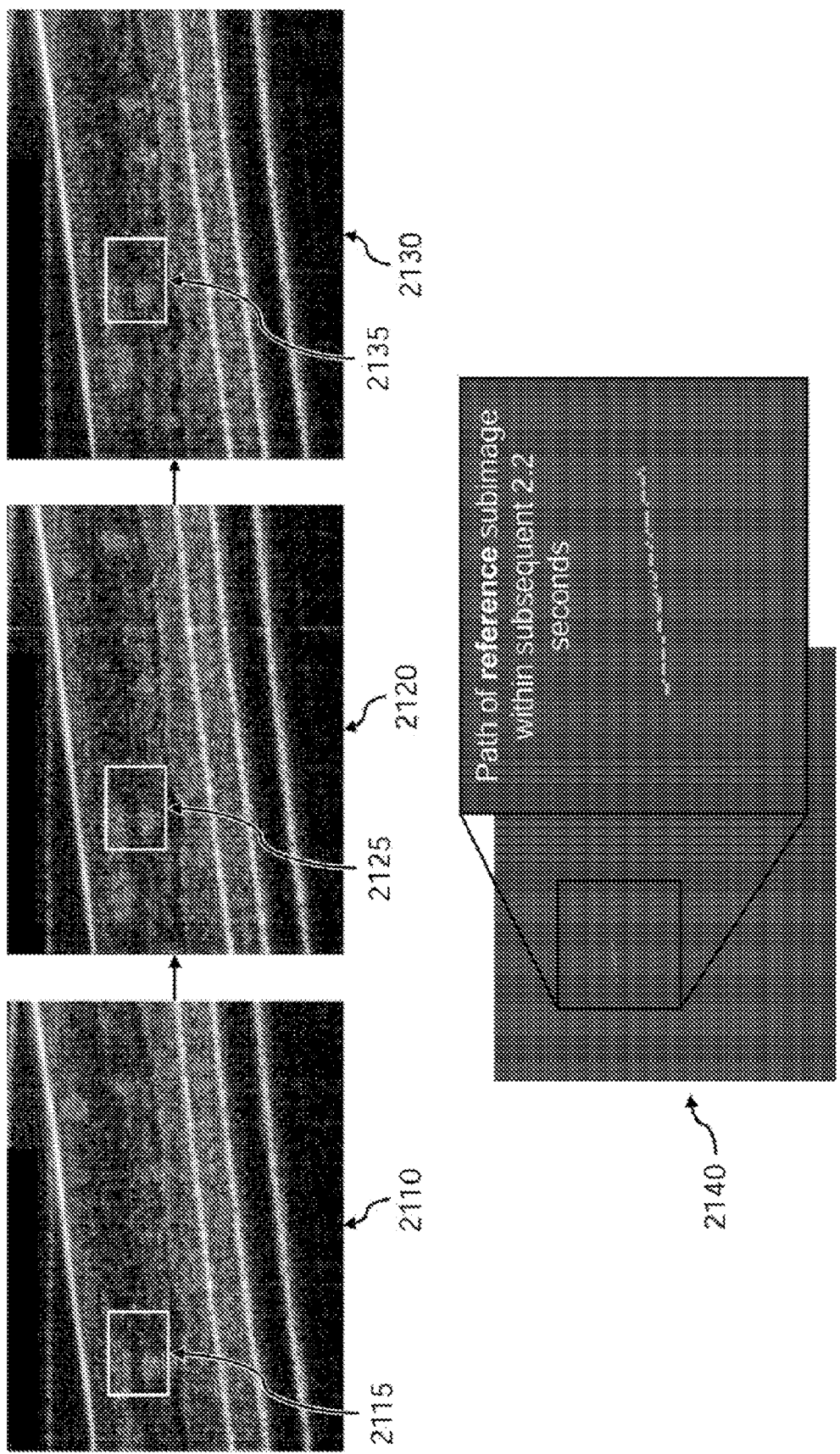
FIG. 21 are a set of exemplary results from the exemplary automated MCT procedure of FIG. 20.

Exemplary results from the exemplary automated MCT calculation are shown in FIG. 21. For example, images 2110, 2120 and 2130 can demonstrate the characteristic mucus heterogeneity that allows for tracking. The exemplary images 2110, 2120 and 2130 are three exemplary frames of the same image sequence of wild-type HBE cells, separated by 1 second each. A section 2115 can be identified as the region of greatest variation within 2110, and can be thus chosen as the reference image. Weighted cross-correlation can identify sections 2125 and 2135 as the most likely locations for reference image 2115 within the exemplary images 2120 and 2130, respectively. Performing this exemplary calculation for every frame—between sections 2110 and 2130 facilitates a reconstruction of the path of reference image 2110, shown in image 2140. The exemplary MCT can then be extracted from this path using the known conversion from pixels to microns.

Figure 22:
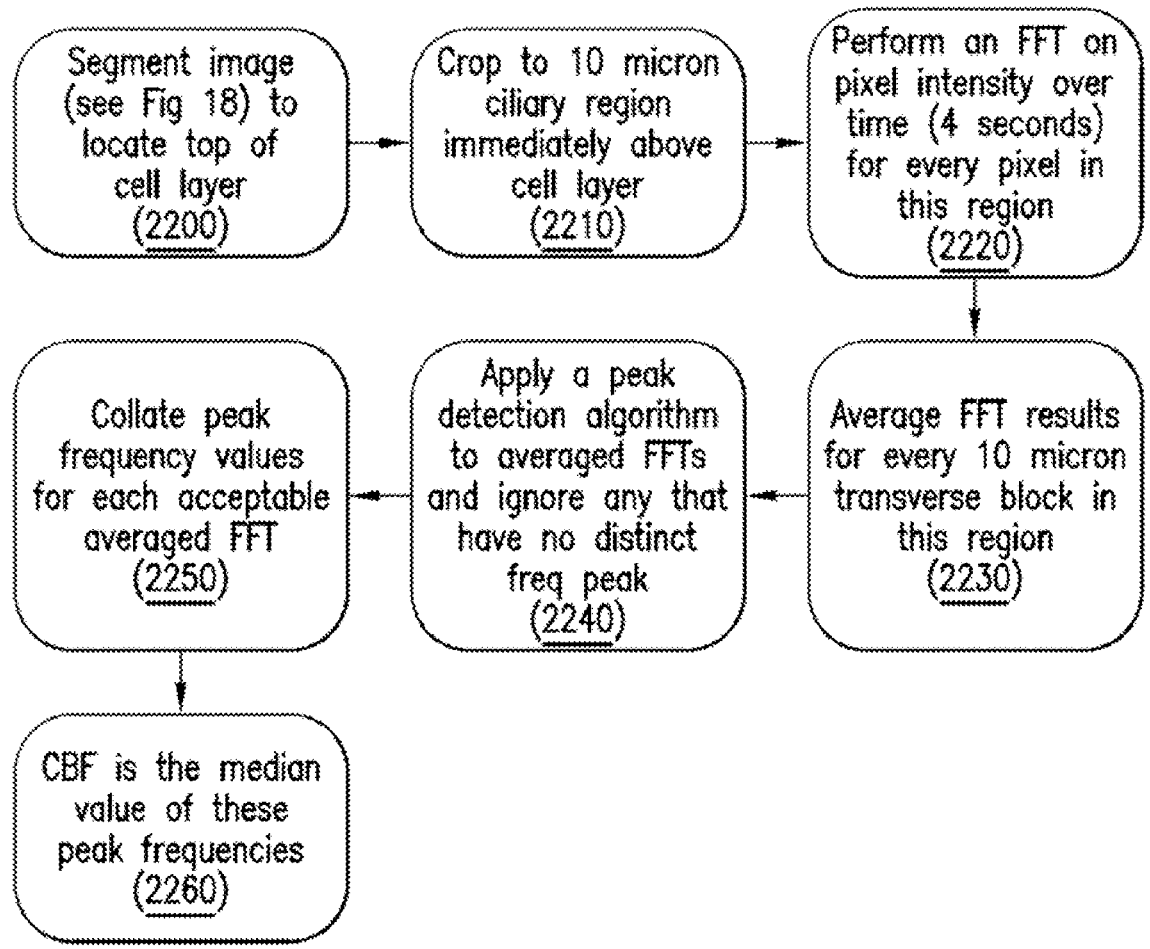
FIG. 22 is a flow diagram of a procedure used to determine ciliary beat frequency (CBF) from μOCT images of respiratory epithelium according to an exemplary embodiment of the present disclosure.

FIG. 22 shows a flow diagram of exemplary method and/or procedure for automated ciliary beat frequency (CBF) measurement according to an exemplary embodiment of the present disclosure. For example, the first block 2200 is to locate the apical surface of the cell layer, utilizing the exemplary ASL procedure described herein with reference to FIG. 18. This exemplary border can be used in block 2210 to crop to region of interest to, e.g., the 10 micron area immediately above the apical epithelial border, where we expect to find beating cilia. In block 2220, an FFT can be performed on the intensity value over 4 seconds for each pixel in this region. Pixels that are displaying regular ciliary motion will have distinct peaks in their FFT at the ciliary beat frequency, while pixels uninvolved with ciliary motion can have unremarkable FFTs. To mitigate the effect of noise within individual pixels, the FFT results can be averaged over every 10 micron transverse section in this region of interest (step 2230). A peak detection procedure can be applied to the resulting averaged FFT to determine whether this region has consistent ciliary motion. If no peak is found, the section can be ignored. The peak frequency, e.g., for all sections that have valid frequency peaks can be recorded, and the final outputted CBF can be the median of these peak frequencies (blocks 2250 and 2260).

Figure 23:
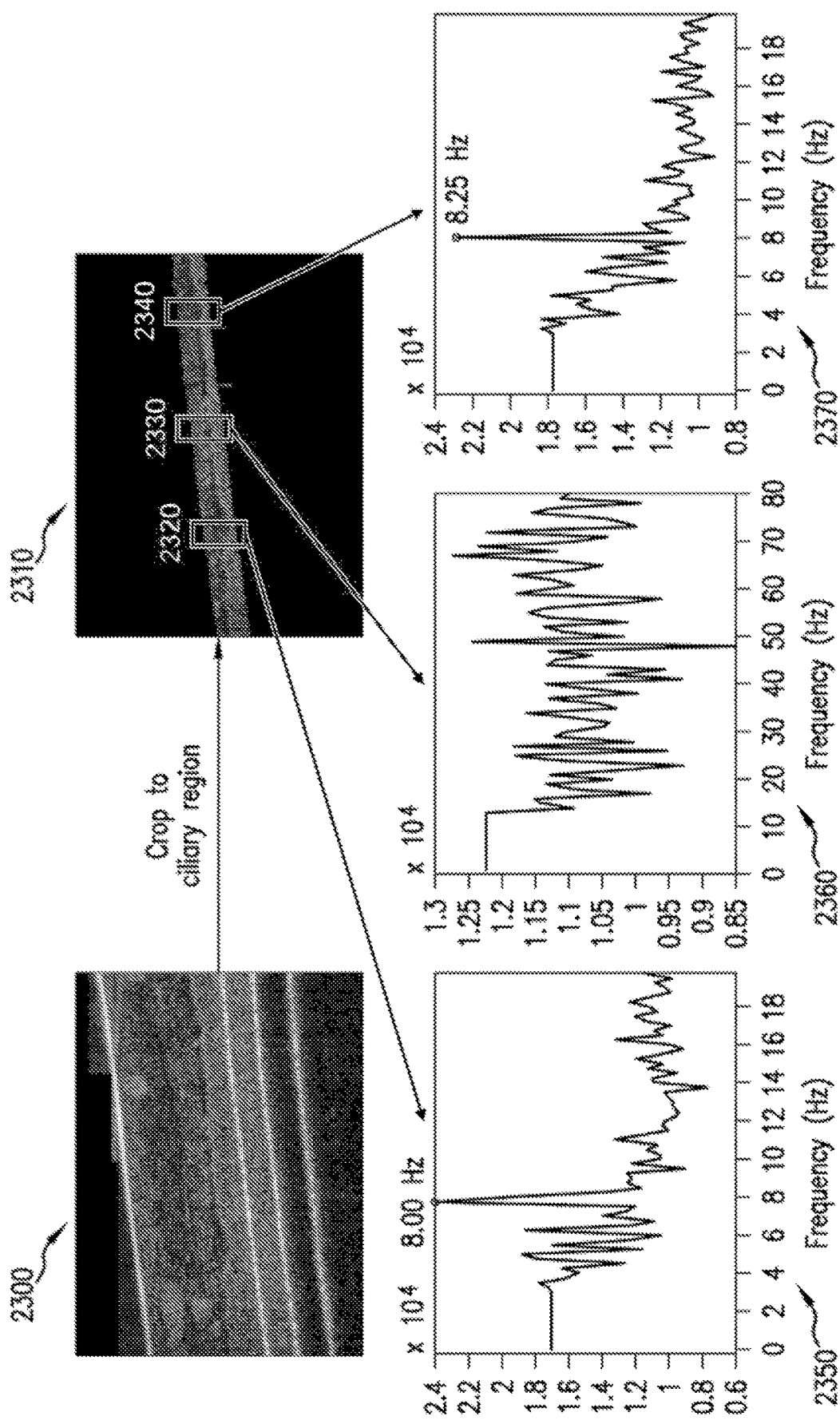
FIG. 23 demonstrates exemplary results from the exemplary automated CBF procedure of FIG. 22.

Exemplary results from the automated CBF calculation are shown in FIG. 23. For example, image 2300 can be an exemplary initial image, while image 2310 can be the cropped region of interest following image segmentation. Sections 2320, 2330 and 2340 can be, e.g., three exemplary 10 micron transverse sections and their corresponding averaged FFTs are shown in exemplary graphs 2350, 2360 and 2370, respectively. The graphs 2350 and 2370 illustrate distinct peaks at 8 Hz and 8.25 Hz, respectively, while there is no notable peak in graph 2360. Therefore, the sections 2320 and 2340 can be used as valid regions to determine CBF, while graph 2330 can be ignored.

Figure 24:
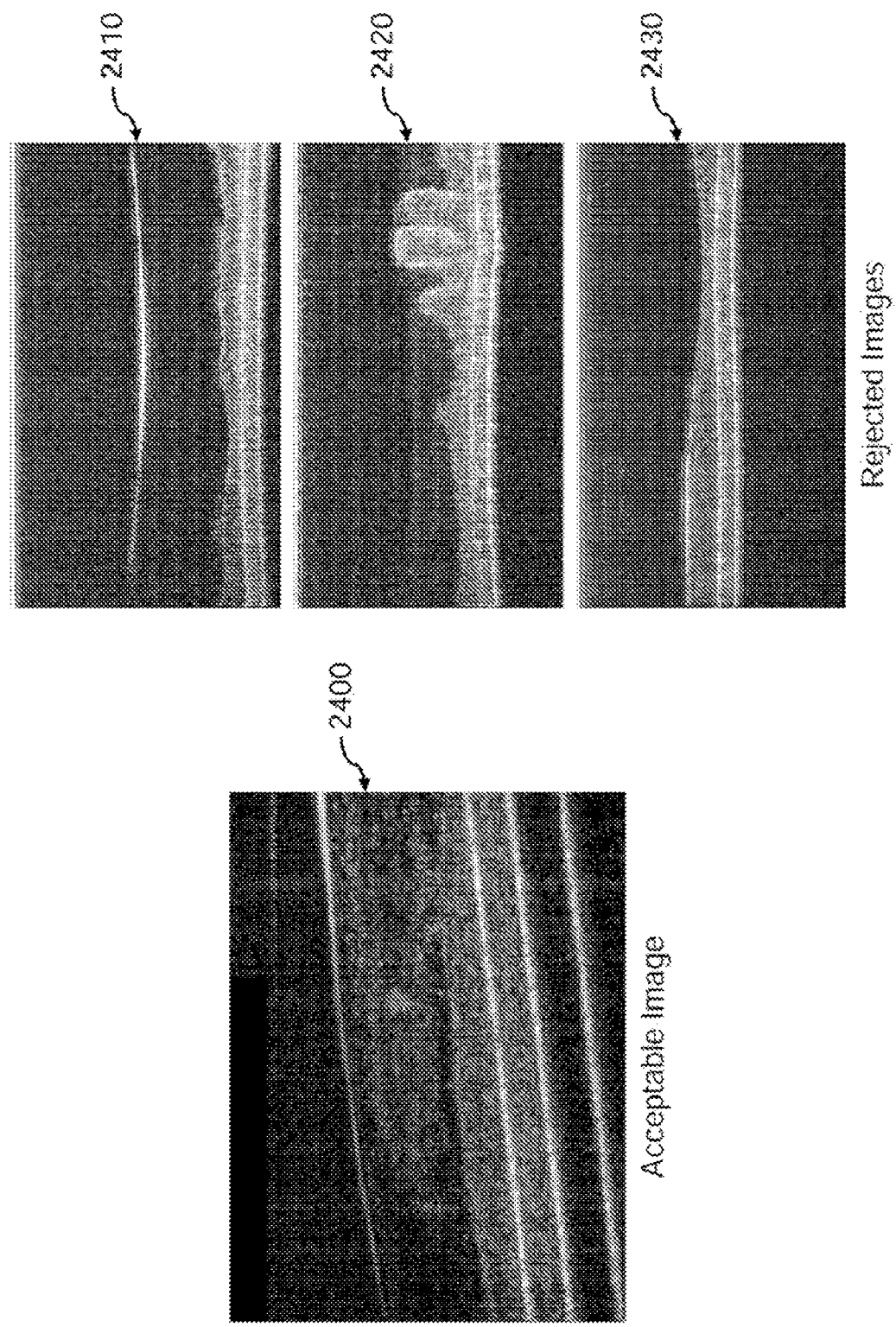
FIG. 24 is a set of exemplary images generated using exemplary quality control procedures utilized to reject invalid or unusable data.

FIG. 24 shows exemplary images generated using exemplary methods according to the exemplary embodiments of the present disclosure providing image quality control. Each exemplary automated procedure can have rejection criteria to force a repeat imaging and/or flag for manual review. Illustration 2400 shows an exemplary acceptable image. Illustration 2410 shows an exemplary image that has no endogenous microparticles visualized, so MCT or viscosity measurement cannot be performed. This exemplary criterion is implemented by rejecting images, where the pixel intensity variation within the mucus region is below a specified threshold. Illustration 2420 can be an exemplary image of irregular cell shapes in the cell layer, indicating an issue with the cell culture. This can be detected by flagging images where the variation in the axial position of the apical cell layer is higher than a specified threshold. Illustration 2430 can be an exemplary case in which the mucus layer is nonexistent or negligible as a result of cell culture error or defective cells producing highly dehydrated mucus. The exemplary cases can be detected when the ASL depth is below a specified threshold. Other reasons for flagging an image for manual review can include lack of repeatable ciliary motion or inability to segment the filter layer, indicating that the cell culture is not in the proper focus plane.

Figure 25:
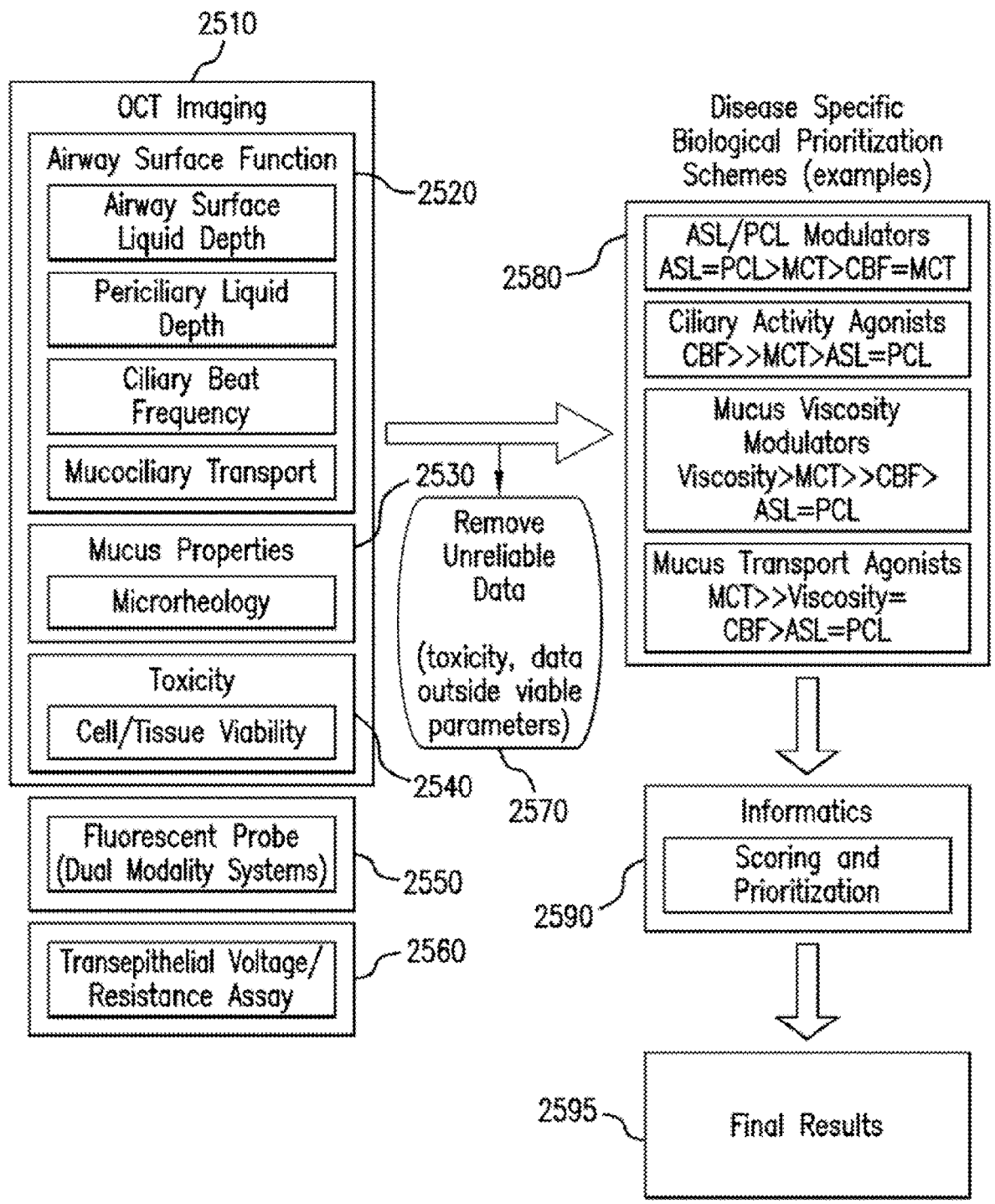
FIG. 25 is a flow diagram/configuration of exemplary informatics strategies for managing high-throughput screening output data, including exemplary procedures for combining multiple metrics into a prioritization score.

An exemplary consequence of a high-throughput system can be a generation of large amounts of data. According to an exemplary embodiment of the present disclosure, a management scheme can be provided for the copious volumes of image data and derived metrics generated by the exemplary μOCT system, as shown in a flow diagram and configuration of FIG. 25. This exemplary management approach is described as follows.

For example, in block 2510, data is obtained from the exemplary μOCT imaging, including the use of airway surface functional microanatomy in block 2520 (which may include airway surface liquid depth, periciliary liquid depth, ciliary beat frequency, and mucociliary transport), in block 2530 properties of mucus can be determined by particle tracking microrheology, and in block 2540, indicators of cell and tissue viability can be combined with additional imaging modality data including in block 2550, data from fluorescent probe indicators and in block 2560, transepithelial voltage/resistance testing. In block 2570, these data can then be subjected to data cleaning to remove data affected by toxicity (e.g. indicators of poor cell and tissue viability) or unreliable data (e.g. data outside reasonable parameters). In block 2580, subsequently, data can be prioritized and a scoring system can be provided based on the specific biological question to be addressed by the screen or secondary characterization. Examples are shown of relative priority of various μOCT parameters, and prioritization scheme is not limited to the examples shown in FIG. 25. In block 2590, exemplary results can be calculated based on implementation of the informatics scheme, yielding final results in block 2595.

Another exemplary μOCT application can be used to perform rheology by the tracking of exogenous or endogenous particles in mucus to determine the dynamic viscoelastic properties of the medium.

Figure 26:
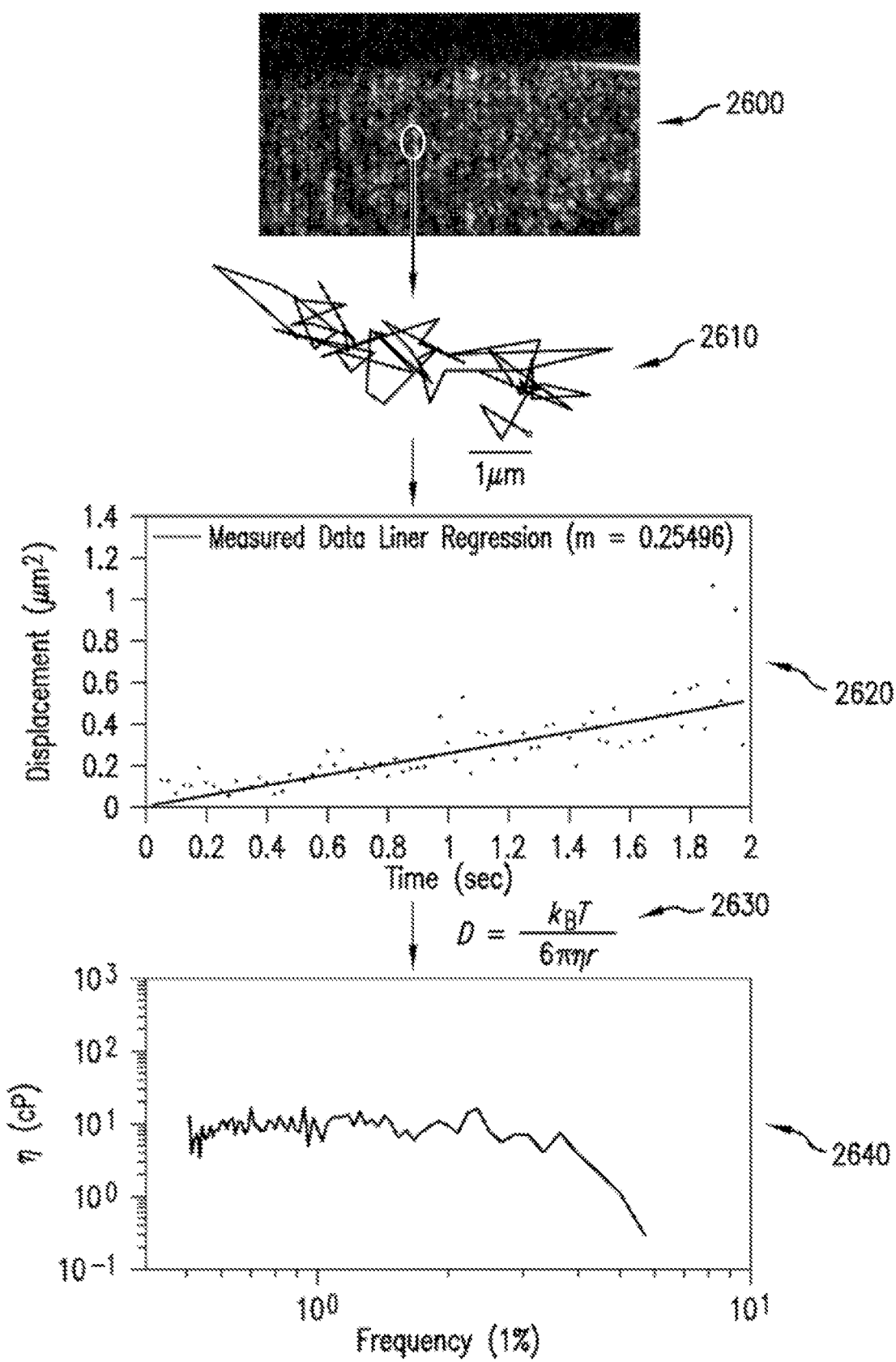
FIG. 26 is a flow diagram of the μOCT rheology procedure employed to analyze images of particle-containing mucus to extract mean squared displacement and viscosity values according to an exemplary embodiment of the present disclosure, as well as exemplary validation results from the exemplary μOCT rheology on phosphate buffer solution, a medium with known viscosity.

For example, FIG. 26 shows a diagram of an exemplary process from which dynamic viscosity can be calculated using the exemplary μOCT images. For example, in section 2600, an exemplary image of cystic fibrosis mucus are provided, which are imaged using the exemplary embodiment(s) of the methods, systems and apparatus according to the present disclosure. Endogenous microparticles can be seen in this exemplary image. Both endogenous and exogenous particles can be localized using a standard commercially available centroid-locating algorithm. Particle position can be tracked in one, two, or three dimensions over time; full three-dimensional tracking allows the measurement of viscosity along all spatial coordinates and captures any anisotropic diffusion behavior. Section 2610 shows an exemplary two-dimensional particle track taken by the highlighted particle over the image sequence. The path of each particle can be a function of both the bulk motion of the mucus and the random Brownian motion of each particle. The mean velocity vector of all tracked particles can be subtracted from each individual particle path to remove the effect of bulk motion, a process further illustrated in FIG. 27. The mean squared displacement (MSD) over time of each particle due to Brownian motion can be calculated using this modified path. Accurate estimation of the expected MSD requires averaging the MSD of multiple particles. Section 2620 shows a plot of MSD averaged over about 30 particles fit to a linear regression. For example, MSD as a function of time can be converted to dynamic viscosity using the Stokes Einstein relationship shown in section 2630. The resulting dynamic viscosity plot is shown in section 2640.

Figure 27:
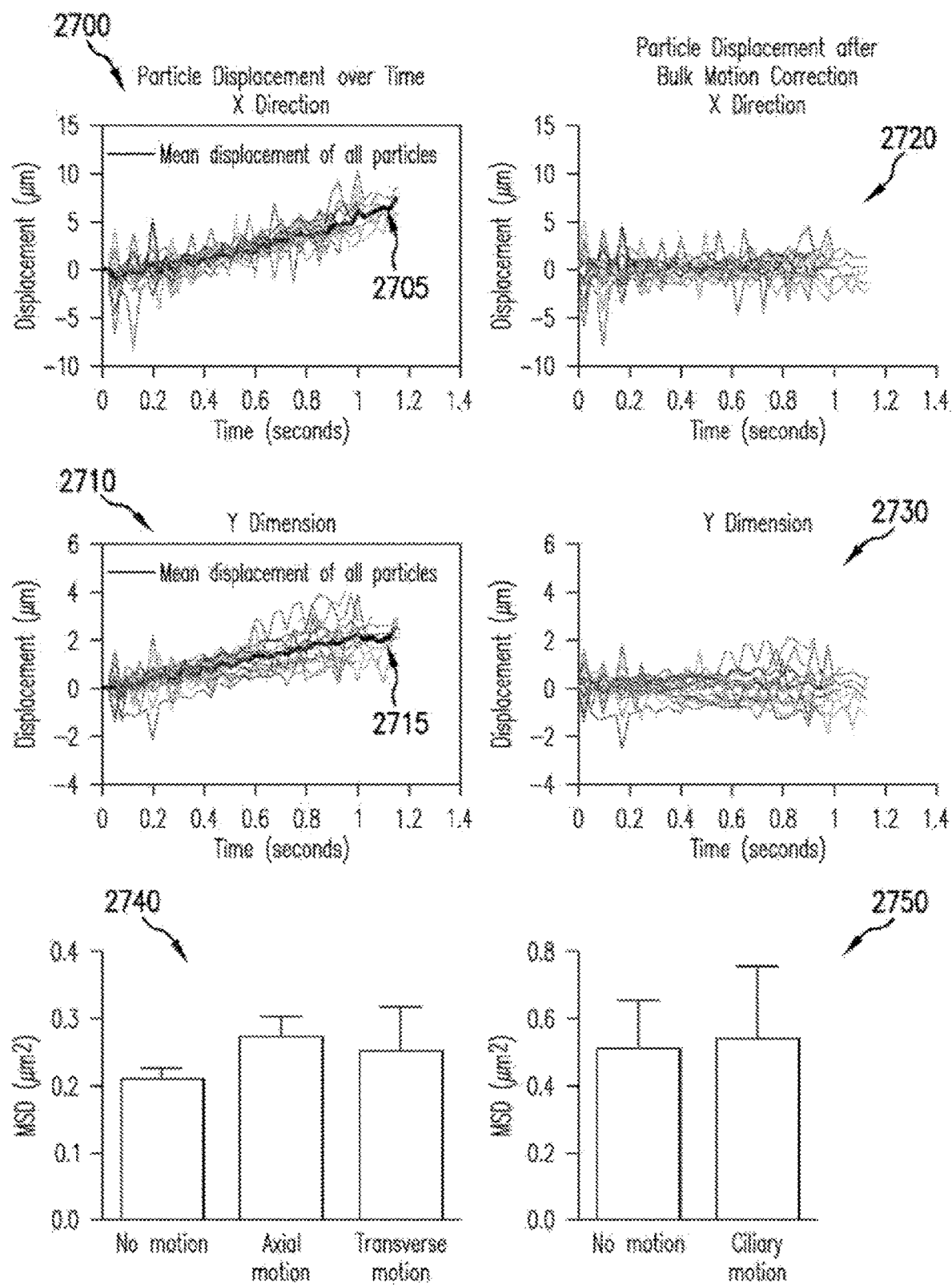
FIG. 27 are illustrations and graphs of exemplary intermediate results from the exemplary μOCT rheology particle tracking procedure that illustrate the bulk motion vector subtraction procedure according to an exemplary embodiment of the present disclosure.

FIG. 27 illustrates a set of graphs providing the bulk motion subtraction from an exemplary dataset, a component of the process shown in FIG. 26. Graphs 2700 and 2710 are x- and y-direction displacements, respectively, of 19 particles tracked over 1.2 seconds. The bulk motion can be recognizable as a drift away from 0 common to all tracks, with the mean displacement of all tracks superimposed on the plots (portions 2705 and 2715). Subtraction of the mean displacement in both x and y directions yields particle tracks with the bulk motion eliminated (portions 2720 and 2730). The effectiveness of bulk motion subtraction was validated by comparing the measured the MSD of natural inclusions in mucus in the absence versus presence of bulk motion. Graph 2740 shows MSDs from collected mucus measured without motion, with induced motion in the axial direction, and with induced motion in the transverse direction. Graph 2750 shows MSDs from epithelial mucus with no ciliary motion present and with active ciliary clearance (which causes bulk motion of the mucus layer). The equivalence of each static and in-motion mucus MSD measurements can indicate a successful removal of the bulk motion component.

Figure 28:
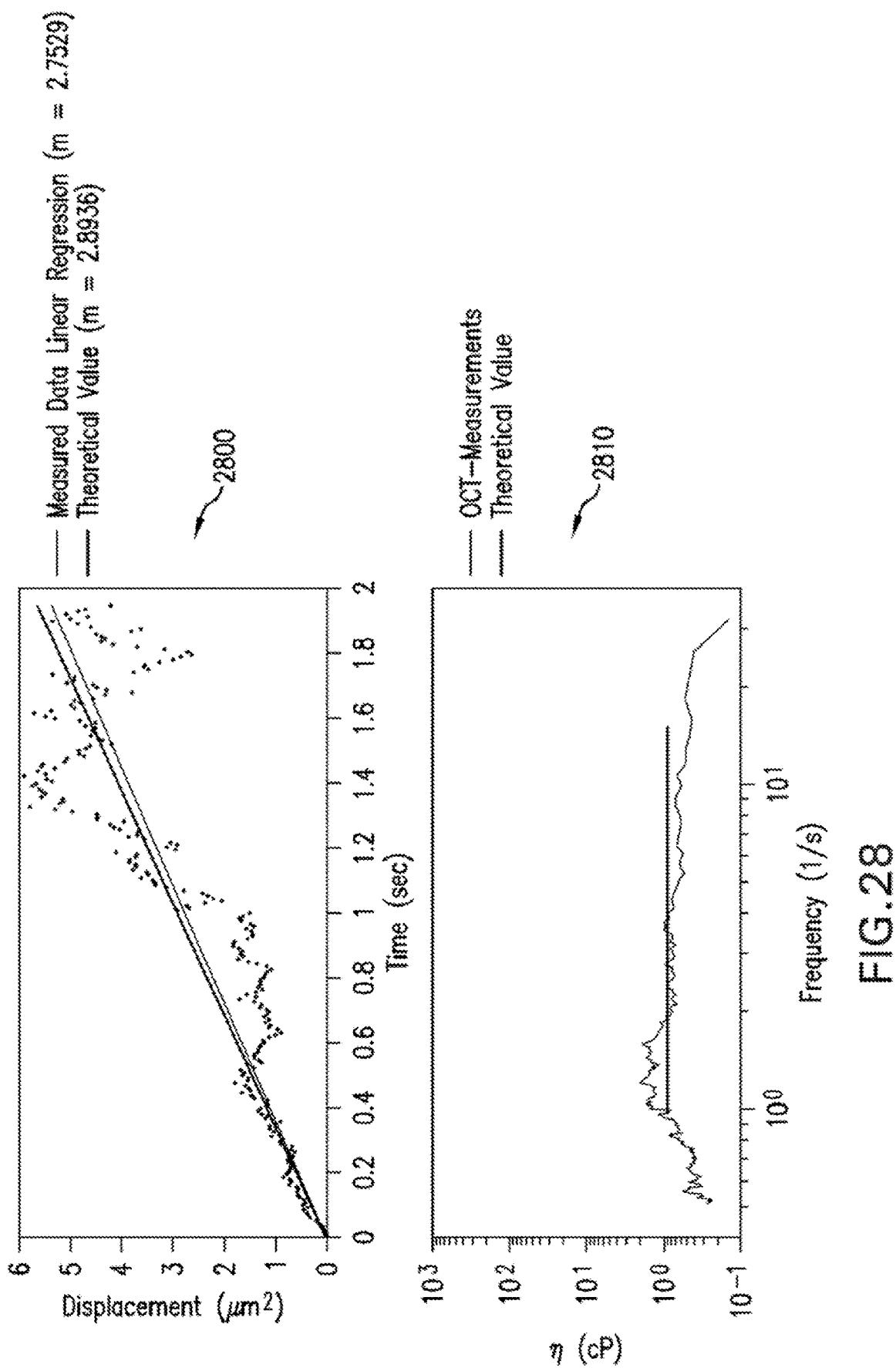
FIG. 28 is a set of graphs providing exemplary viscosity measurements data from phosphate buffer solution using the exemplary μOCT rheology, illustrating close agreement with theoretical expectations.

Exemplary results from μOCT rheology in a validation test appear in exemplary graphs illustrated in FIG. 28, which show the mean squared displacement and calculated dynamic viscosity of a solution of phosphate buffer solution (PBS) with exogenous microparticles. For example, the sample was imaged using the exemplary μOCT procedure and individual particles tracked using the methods described herein with respect to FIG. 26. Graph 2800 indicates the mean squared displacement of the aggregated tracks with a linear regression versus the calculated theoretical displacement from the known viscosity of PBS. Graph 2810 indicates the resulting computed dynamic viscosity over a range of frequencies.

Figure 29:
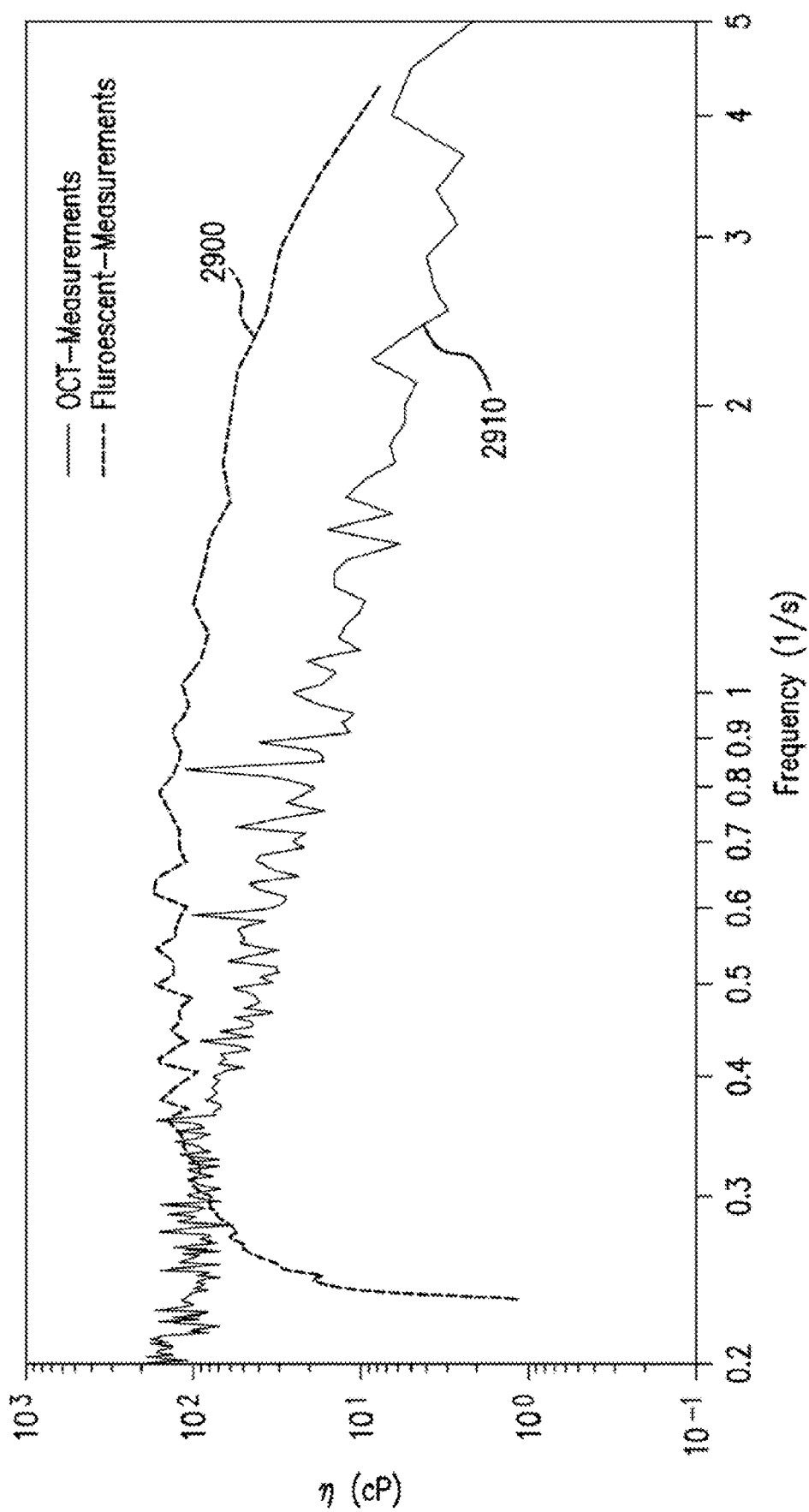
FIG. 29 is a graph pf exemplary viscosity measurements from expectorated sputum using the exemplary μOCT rheology compared to results of the optical standard of fluorescence microscopy.

An exemplary standard method for optical particle-tracking rheology is fluorescence microscopy, which can be compared to the exemplary μOCT results as shown in FIG. 29 using samples from the same expectorated sputum. Traditional fluorescence exogenous particle tracking (line 2900) and the exemplary μOCT-based endogenous particle tracking (line 2910) can produce similar results, thus validating the potential of μOCT for measuring the mechanical properties of mucus.

Figure 30:
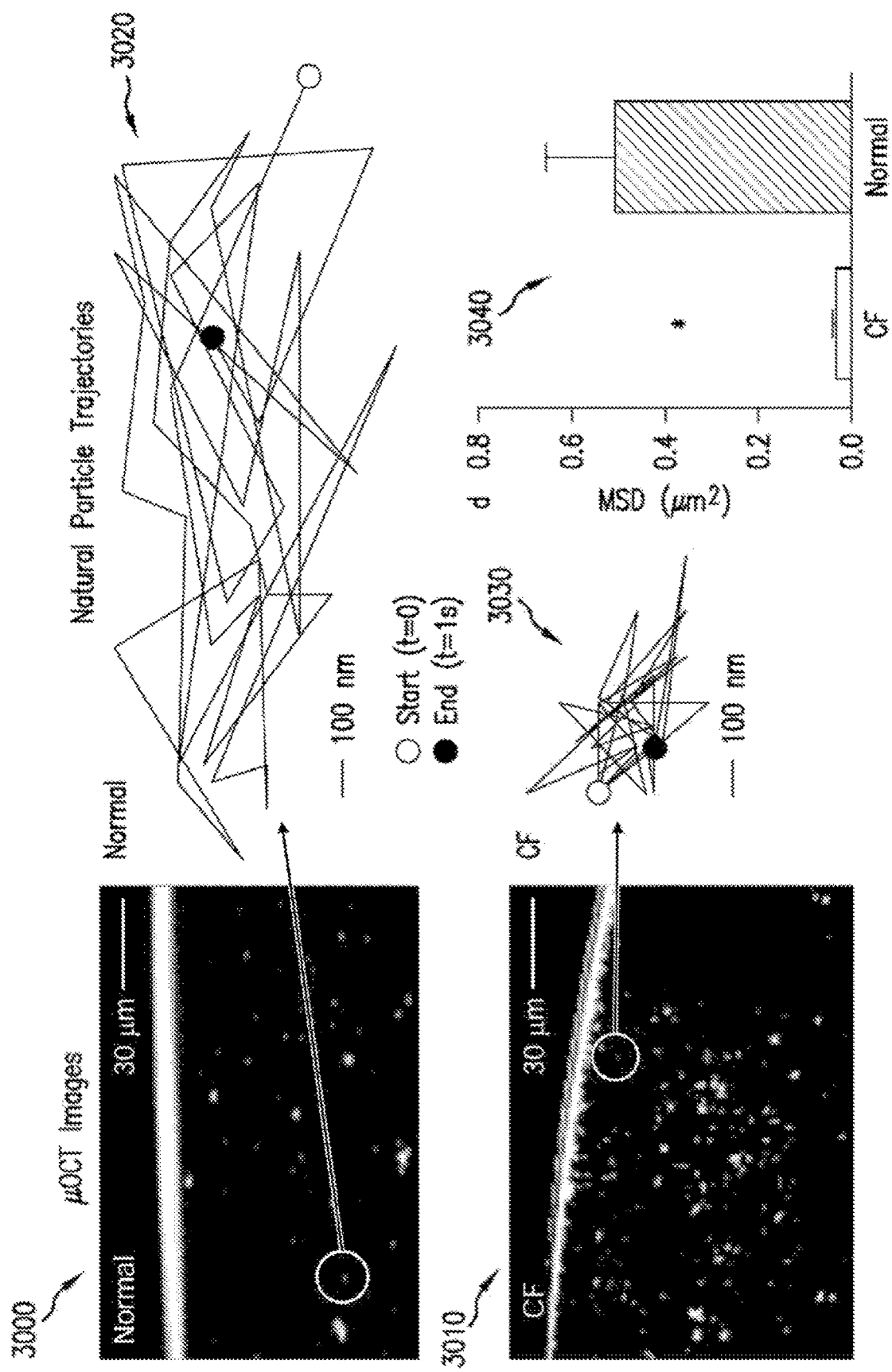
FIG. 30 is a set of exemplary images of normal and CF mucus containing traceable inclusions, exemplary particle trajectories from normal and CF mucus, and resulting mean squared displacement values that demonstrate a statistically significant difference between normal and CF mucus.

Exemplary results from the exemplary μOCT rheology procedure on normal and CF sputum are shown in FIG. 30. For example, the exemplary μOCT images of normal (image 3000) and CF (image 3010) mucus indicate natural inclusions (e.g., diameter ~700 nm, yellow circles). Corresponding two-dimensional trajectories are shown for normal (illustration 3020) and CF (illustration 3030). Bar chart 3040 indicates MSDs of natural particles in the respective cases, and statistical significance in this 5-measurement sample is demonstrated with $p<0.05$.

The foregoing merely illustrates the principles of the present disclosure. Various modifications and alterations to the described embodiments will be apparent to those skilled in the art in view of the teachings herein. Indeed, the arrangements, systems and methods according to the exemplary embodiments of the present disclosure can be used with and/or implement any OCT system, OFDI system, SD-OCT system or other imaging systems, and for example with those described in International Patent Application No. PCT/US2004/029148, filed Sep. 8, 2004 which published as International Patent Application Publication No. WO 2005/047813 on May 26, 2005, U.S. patent application Ser. No. 11/266,779, filed Nov. 2, 2005 which published as U.S. Patent Application Publication No. 2006/0093276 on May 4, 2006, and U.S. patent application Ser. No. 10/501,276, filed Jul. 9, 2004 which published as U.S. Patent Application Publication No. 2005/0018201 on Jan. 27, 2005, U.S. Patent Application Publication No. 2002/0122246, published on May 9, 2002, U.S. Patent Application No. 61/649,546, U.S. patent application Ser. No. 11/625,135, and U.S. Patent Application No. 61/589,083, the disclosures of which are incorporated by reference herein in their entireties. It will thus be appreciated that those skilled in the art will be able to devise numerous systems, arrangements and methods which, although not explicitly shown or described herein, embody the principles of the present disclosure and are thus within the spirit and scope of the present disclosure. Further, various exemplary embodiments described herein can be interchangeably used with all other exemplary described embodiments, as should be understood by those having ordinary skill in the art. In addition, to the extent that the prior art knowledge has not been explicitly incorporated by reference herein above, it is explicitly being incorporated herein in its entirety. All publications referenced herein above are incorporated herein by reference in their entireties.

What is claimed is:

1. An apparatus for obtaining data regarding a plurality of samples, comprising:
    a micro-optical coherence tomography (μOCT)-based screening system comprising at least one interferometer arrangement which receives interferometric information that is based on radiations provided from a reference interfered with each of the plurality of samples,
    the μOCT-based screening system configured to provide focused light with an extended depth of focus to the plurality of samples; and
    at least one computer arrangement which is configured to:
        obtain data regarding a structure of each of the plurality of samples using the interferometric information,
        locate one or more features represented in the data, each of the one or more features regarding the structure of a particular sample of the plurality of samples, and
        calculate a metric that is indicative of a state of the particular sample using the one or more features.

2. The apparatus according to claim 1, wherein each of the one or more features comprises at least one of a peak in the data, an edge, a depth of a portion of the sample, a size, a motion of a portion of the sample, and a frequency of motion of a portion of the sample.

3. The apparatus according to claim 1, wherein the at least one interferometer arrangement comprises at least one optics configuration which is configured to focus at least one electromagnetic radiation on the samples, and
    wherein a depth range of the focus of the at least one electromagnetic radiation caused by the at least one optics configuration is greater than a confocal parameter associated with a transverse resolution of the focus.

4. The apparatus according to claim 1, wherein each of the plurality of samples is provided in a respective chamber, and each of the respective chambers has an agent.

5. The apparatus according to claim 4, wherein one of the agents is different from another one of the agents.

6. The apparatus according to claim 1, wherein the particular sample includes a living cell.

7. The apparatus according to claim 6, wherein the living cell forms a portion of an in vivo airway of a subject.

8. The apparatus according to claim 1, wherein the particular sample includes a cilia.

9. The apparatus according to claim 1, wherein each of the plurality of samples is an in vivo tissue sample.

10. The apparatus according to claim 1, wherein the metric is an airway surface liquid (ASL) depth associated with the particular sample.

11. The apparatus according to claim 1, wherein the metric is a periciliary liquid layer (PCL) depth associated with the particular sample.

12. The apparatus according to claim 1, wherein the metric is a ciliary beat frequency (CBF) associated with the particular sample.

13. The apparatus according to claim 1, wherein the metric is mucociliary transport (MCT) associated with the particular sample.

14. The apparatus according to claim 1, wherein the metric is a dynamic viscosity associated with the particular sample.

15. The apparatus according to claim 1, wherein the metric is based on motion of at least a portion of the particular sample over time.

16. The apparatus according to claim 15, wherein the metric is based on motion of microparticles associated with the particular sample.

17. The apparatus according to claim 15, wherein the metric is based on motion of at least one cilia associated with the particular sample.

18. The apparatus according to claim 1, wherein the metric is based on the depth of at least one layer associated with the particular sample.

19. The apparatus according to claim 1, wherein the at least one computer arrangement is further configured to:
   generate, based on the data regarding structure of each of the plurality of samples, a plurality of images that each depict the particular sample,
      wherein each of the plurality of images comprises pixels that are each associated with each of a respective plurality of positions;
   generate a composite image of the particular sample based on a minimum pixel value at each of the respective plurality of positions across the plurality of images; and
   locate the one or more features in the composite image of the particular sample.

20. The apparatus according to claim 1, further comprising:
   a probe comprising:
      an inner shuttle tube;
      a rigid drive shaft coupled to the inner shuttle tube and configured to mechanically drive the inner shuttle tube longitudinally relative to an outer tube;
      an optical fiber having a distal end coupled to the drive shaft; and
      optics optically coupled to the optical fiber, wherein the optics are configured to:
         redirect a first radiation transmitted from a source via the optical fiber from an optical axis of the optical fiber toward a periphery of the probe,
         receive a second radiation reflected from the plurality of samples, and
         redirect the second radiation toward the distal end of the optical fiber.

21. The apparatus according to claim 1, further comprising:
   a probe comprising:
      a sheath;
      an optical fiber having a distal end;
      optics optically coupled to the optical fiber, wherein the optics are configured to:
         redirect a first radiation transmitted from a source via the optical fiber from an optical axis of the optical fiber toward a periphery of the probe,
         receive a second radiation reflected from the plurality of samples, and
         redirect the second radiation toward the distal end of the optical fiber; and
      a drive shaft coupled to the optical fiber and the optics, wherein the drive shaft is configured to:
         facilitate longitudinal scanning of the optics within the sheath, and rotate the optics about the optical axis of the optical fiber to facilitate radial scanning of the optics.

* * * * *

UNITED STATES PATENT AND TRADEMARK OFFICE
CERTIFICATE OF CORRECTION

PATENT NO. : 10,942,112 B2
APPLICATION NO. : 16/365188
DATED : March 9, 2021
INVENTOR(S) : Steven M. Rowe et al.

It is certified that error appears in the above-identified patent and that said Letters Patent is hereby corrected as shown below:

In the Specification

Column 1, Lines 23-27:
"This invention was made with government support under DAMD17-99-2-9001 awarded by the U.S. Department of the Army, and BES-0086789 awarded by the National Science Foundation. The government has certain rights in the invention."

Should be:
--This invention was made with government support under DAMD17-99-2-9001 awarded by the U.S. Department of the Army, BES-0086789 awarded by the National Science Foundation, and UAB DK072482 awarded by National Institutes of Health. The government has certain rights in the invention.--.

Signed and Sealed this
Fifth Day of December, 2023

Katherine Kelly Vidal
*Director of the United States Patent and Trademark Office*